United States Patent
Inoue et al.

(10) Patent No.: US 8,468,287 B2
(45) Date of Patent: Jun. 18, 2013

(54) INFORMATION PROCESSOR AND INFORMATION PROCESSING METHOD

(75) Inventors: Hiroaki Inoue, Tokyo (JP); Takashi Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 659 days.

(21) Appl. No.: 12/671,982

(22) PCT Filed: Apr. 25, 2008

(86) PCT No.: PCT/JP2008/058062
§ 371 (c)(1),
(2), (4) Date: Feb. 3, 2010

(87) PCT Pub. No.: WO2009/025104
PCT Pub. Date: Feb. 26, 2009

(65) Prior Publication Data
US 2011/0202697 A1 Aug. 18, 2011

(30) Foreign Application Priority Data
Aug. 22, 2007 (JP) ................................. 2007-215896

(51) Int. Cl.
*G06F 13/00* (2006.01)

(52) U.S. Cl.
USPC ........................................... 710/316; 710/110

(58) Field of Classification Search
USPC ...... 710/110, 306, 312, 316, 317; 714/10–12, 714/15
See application file for complete search history.

(56) References Cited

U.S. PATENT DOCUMENTS

| | | | | |
|---|---|---|---|---|
| 5,271,023 A | * | 12/1993 | Norman | 714/10 |
| 5,630,056 A | * | 5/1997 | Horvath et al. | 714/56 |
| 6,173,414 B1 | * | 1/2001 | Zumkehr et al. | 714/6.24 |
| 6,496,940 B1 | * | 12/2002 | Horst et al. | 714/4.3 |
| 6,578,100 B1 | * | 6/2003 | Ninomiya et al. | 710/305 |

(Continued)

FOREIGN PATENT DOCUMENTS

| JP | 11-045229 A | 2/1999 |
|---|---|---|
| JP | 11-232237 A | 8/1999 |

(Continued)

OTHER PUBLICATIONS

International Search Report for PCT/JP2008/058062, mailed Jun. 10, 2008.

*Primary Examiner* — Khanh Dang

(57) ABSTRACT

An information processor includes: a plurality of master cores, a plurality of slave cores, a plurality of slave adapters each connected to a respective slave core of the plurality of slave cores, and an interconnected network for connecting the master cores and slave adapters by way of a plurality of router nodes. The slave adapters compare a first access request transmitted by a first master core among the plurality of master cores and a second access request transmitted by a second master core other than the first master core among the plurality of master cores based on a request from the first master core and a request from the second master core, and transmit the first access request or the second access request to the slave core that is connected to the slave adapter when the first access request and the second access request match.

18 Claims, 19 Drawing Sheets

U.S. PATENT DOCUMENTS

| | | | |
|---|---|---|---|
| 6,772,368 B2 * | 8/2004 | Dhong et al. | 714/11 |
| 7,111,084 B2 * | 9/2006 | Tan et al. | 710/15 |
| 7,145,903 B2 * | 12/2006 | Gutierrez | 370/362 |
| 2005/0076169 A1 * | 4/2005 | Modelski et al. | 710/100 |
| 2006/0095635 A1 * | 5/2006 | Vinogradov et al. | 710/309 |
| 2007/0255886 A1 * | 11/2007 | Dao et al. | 710/317 |
| 2008/0123522 A1 * | 5/2008 | Elliott et al. | 370/220 |

FOREIGN PATENT DOCUMENTS

| | | |
|---|---|---|
| JP | 2006-178734 A | 7/2006 |
| JP | 2006-197522 A | 7/2006 |
| JP | 2006-302289 A | 11/2006 |
| JP | 2007-11639 A | 1/2007 |
| JP | 2007-42001 A | 2/2007 |

* cited by examiner

--PRIOR ART--

INFORMATION PROCESSOR AND INFORMATION PROCESSING METHOD

TECHNICAL FIELD

The present invention relates to an information processor having a multiplicity of CPUs connected in an interconnected network and to an information processing method in the information processor.

BACKGROUND ART

With the development of information processing technology in recent years, it is anticipated that many CPUs (Central Processing Units) will be incorporated in information processors of the future. However, there is concern that the development of the miniaturization of semiconductors, which is the basis for this information processing technology, will detract from the reliability of information processors such as semiconductor integrated circuits. Accordingly, the realization of both higher information processing performance and higher reliability will be indispensable to information processors having a multiplicity of processors.

FIG. 1 shows an example of the configuration of a typical information processor that uses two CPUs to raise performance and reliability.

The information processor shown in FIG. 1 is provided with CPUs 10000A and 10000B, comparator 11000, and bus 12000. When higher reliability is necessary, bus access of CPUs 10000A and 10000B is monitored by operating comparator 11000 that is provided between bus 12000 and CPUs 10000A and 10000B. During monitoring, reliability is improved by implementing a recovery process when disagreement occurs between CPUs 10000A and CPU 10000B. On the other hand, when higher performance is necessary, parallel processing is implemented using CPUs 10000A and 10000B without operating comparator 11000. In this way, a device that achieves both high performance and high reliability can be realized in a device that is provided with a plurality of CPUs (for example, refer to JP-A-2006-302289).

However, the above-described device suffers from the drawback that reliability can be improved only between CPUs that have been determined in advance. An additional problem is the waste of a large amount of wiring resources and area for just the connections between the outputs of the CPUs and the comparator when there is an extremely large number of CPUs. A further problem that accompanies this case is the increase in cost expended in the device.

It has thus been problematic to realize switching between a high-reliability mode and a high-performance mode at low cost between any of the CPUs in a device that includes a multiplicity of CPUs connected by an interconnected network.

DISCLOSURE OF THE INVENTION

It is an object of the present invention to solve the above-described problems by providing an information processor and information processing method that allow easy realization of switching between a high-reliability mode and a high-performance mode between any CPUs in a device having a multiplicity of CPUs connected by an interconnected network.

The present invention for achieving the above-described object includes:
a plurality of master cores that are arithmetic devices capable of programmed operation;
a plurality of slave cores that are peripheral devices of the master cores;
a plurality of slave adapters connected to each of the plurality of slave cores; and
an interconnected network for connecting the master cores and the slave adapters by way of a plurality of router nodes;
wherein the slave adapters compare a first access request transmitted by a first master core among the plurality of master cores and a second access request transmitted by a second master core other than the first master core among the plurality of master cores based on a request from the first master core and a request from the second master core; and when the first access request and the second access request match, transmit the first access request or the second access request to the slave core that is connected to the slave adapter.

In the present invention, as described hereinabove, the adoption of a configuration in which, a first access request transmitted by a first master core among the plurality of master cores is compared with a second access request transmitted by a second master core among the plurality of master cores other than the first master core based on a request from the first master core and a request from the second master core and when the first access request and second access request match, the first access request or the second access request is transmitted to the slave core that is connected to the slave adapter, and as a result, switching between a high-reliability mode and a high-performance mode between any of the CPUs can be easily realized in a device having a plurality of CPUs connected by an interconnected network.

BEST MODE FOR CARRYING OUT THE INVENTION

Explanation next regards embodiments of the present invention with reference to the accompanying figures.

Figure 1:
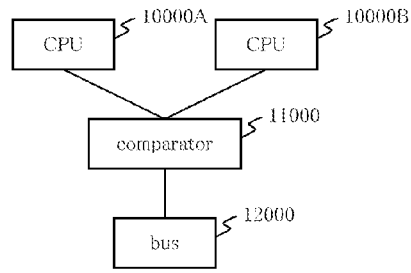
FIG. 1 shows an example of the configuration of a typical information processor for improving performance and reliability using two CPUs.
Figure 2:
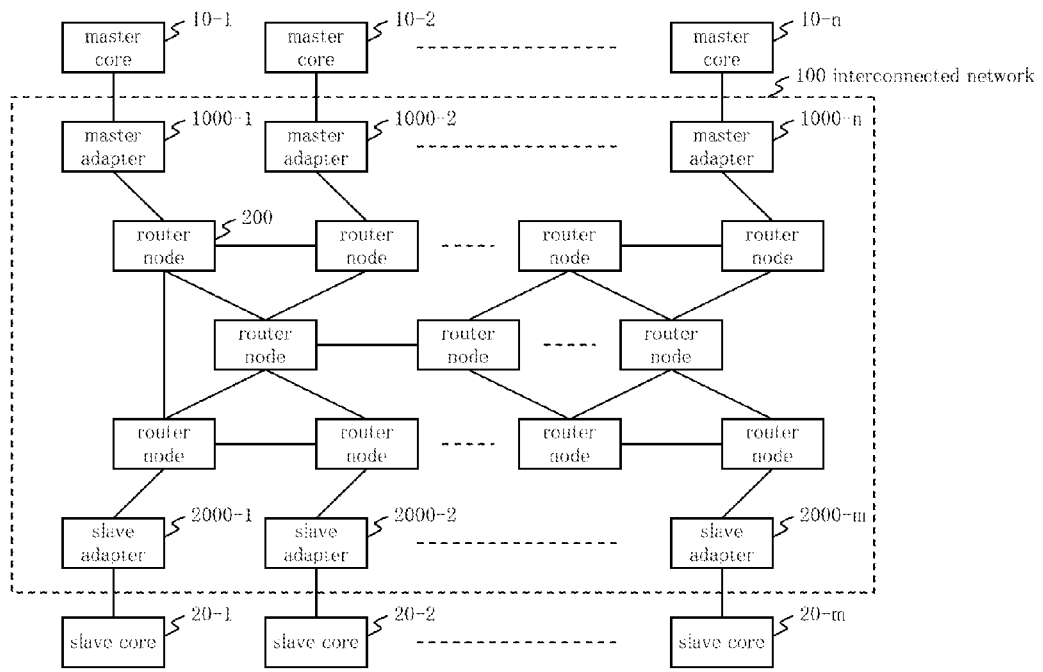
FIG. 2 shows the first embodiment of the information processor of the present invention.

FIG. 2 shows the first embodiment of the information processor of the present invention.

As shown in FIG. 2, the present embodiment is of a configuration made up from: master cores $10\text{-}1\text{-}10\text{-}n$, interconnected network 100, and slave cores $20\text{-}1\text{-}20\text{-}m$. Interconnected network 100 is further made up from: master adapters $1000\text{-}1\text{-}1000\text{-}n$, a plurality of router nodes 200, and slave adapters $2000\text{-}1\text{-}2000\text{-}m$. Master cores $10\text{-}1\text{-}10\text{-}n$ and slave cores $20\text{-}1\text{-}20\text{-}m$ are connected by way of master adapters $1000\text{-}1\text{-}1000n$, router nodes 200, and slave adapters $2000\text{-}1\text{-}2000\text{-}m$.

In the present embodiment, the provision of a comparison function on the side of slave cores $20\text{-}1\text{-}20\text{-}m$ solves both the problem of the increase in cost arising from the existence of the multiplicity of master cores $10\text{-}1\text{-}10\text{-}n$ and the problem that comparison cannot be carried out in any of master cores $10\text{-}1\text{-}10\text{-}n$. Here, in the typical technology in which a comparison function is provided on the side of master cores $10\text{-}1\text{-}10\text{-}n$, a single comparison point is present. In contrast, the present invention allows any of master cores $10\text{-}1\text{-}10\text{-}n$ to consult any of slave cores $20\text{-}1\text{-}20\text{-}m$, whereby the number of comparison points is increased to a plurality. In order to cope with this increase in comparison points, the present invention realizes coordination between the master cores $10\text{-}1\text{-}10\text{-}n$ that carry out requests and slave cores $20\text{-}1\text{-}20\text{-}m$ that perform reception and comparison of requests to realize synchronization of the comparison function between separated components.

The following explanation is based on working examples.

WORKING EXAMPLES

In the form shown in FIG. 2, master cores $10\text{-}1\text{-}10\text{-}n$ are arithmetic devices capable of programmed operation such as CPUs, signal processors, or VLIW (Very Long Instruction Word) processors, or configurable processors.

Slave cores $20\text{-}1\text{-}20\text{-}m$ are peripheral devices such as memory or I/O.

In addition, each of master cores $10\text{-}1\text{-}10\text{-}n$, slave cores $20\text{-}1\text{-}20\text{-}m$, master adapters $1000\text{-}1\text{-}1000\text{-}n$, slave adapters $2000\text{-}1\text{-}2000\text{-}m$, router nodes 200, and interconnected network 100 may take the form of separate package constructions. In addition, these components may be circuit constructions in an SoC (System-on-Chip), SiP (System-in-Package) constructions realized on separate chips, a three-dimensional LSI structure, or a construction composed of a combination of these constructions.

Router nodes 200 realize the function of transmitting network packets that have been received to adjacent routers according to path information that has been set.

Master adapters $1000\text{-}1\text{-}1000\text{-}n$ convert access requests from master cores $10\text{-}1\text{-}10\text{-}n$ to network packets. Alternatively, master adapters $1000\text{-}1\text{-}1000\text{-}n$ convert network packets that have been received to access responses to master cores $10\text{-}1\text{-}10\text{-}n$. In the present embodiment, a function is provided for issuing a request for starting or stopping comparison. In this case, master adapters $1000\text{-}1\text{-}1000\text{-}n$ exist as means independent from router nodes 200 or master cores $10\text{-}1\text{-}10\text{-}n$. If master adapters 1000-1-1000-*n* are circuits for realizing access and packet conversion functions, they may be incorporated in router nodes 200 or master cores 10-1-10-*n*.

Slave adapters 2000-1-2000-*m* convert network packets that have been received to access requests to slave cores 20-1-20-*m*. Alternatively, slave adapters 2000-1-2000-*m* convert access responses from slave cores 20-1-20-*m* to network packets. In the present embodiment, slave adapters 2000-1-2000-*m* have the further role of receiving requests to start or stop comparison and of comparing access requests between designated master cores 10-1-10-*n*. Here, slave adapters 2000-1-2000-*m* exist as a means that are independent from router nodes 200 or slave cores 20-1-20-*m*. In addition, if slave adapters 2000-1-2000-*m* are circuits that perform access and packet conversion functions, they may be incorporated in router nodes 200 or slave cores 20-1-20-*m*.

Figure 3:
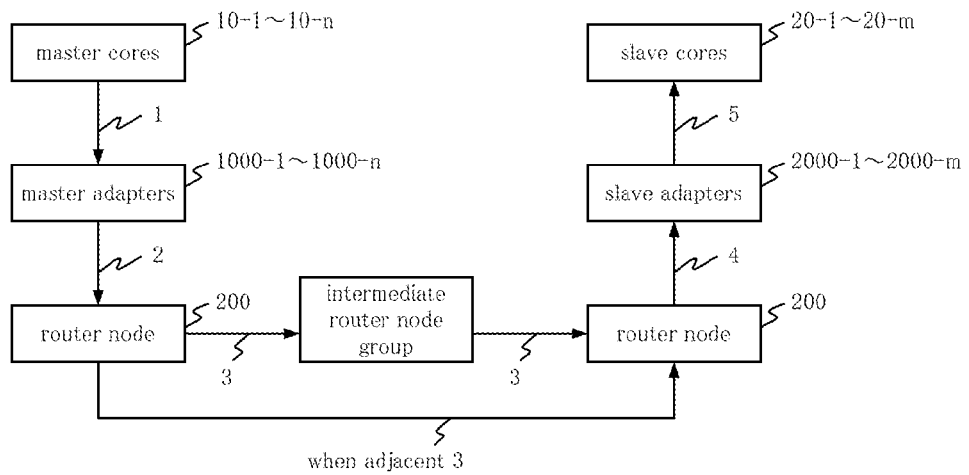
FIG. 3 is an explanatory view of an example of the operation of the information processor shown in FIG. 2.

FIG. 3 is an explanatory view of an example of the operation of the information processor shown in FIG. 2. In this example, a method is described for transferring data from master cores 10-1-10-*n* to slave cores 20-1-20-*m* by way of master adapters 1000-1-1000-*n*, a plurality of router nodes 200, an intermediate router node group, and slave adapters 2000-1-2000-*m*.

In Step 1, master cores 10-1-10-*n* submit to master adapters 1000-1-1000-*n* access requests that are, for example, for read access or write access. At this time, master adapters 1000-1-1000-*n* for which access requests are submitted by master cores 10-1-10-*n* are master adapters 1000-1-1000-*n* that are connected to master cores 10-1-10-*n*.

Master adapters 1000-1-1000-*n* for which access is requested convert the access requests of master cores 10-1-10-*n* to a packet structure that is required for transfer on the interconnected network. The converted packets are then passed to router nodes 200 in Step 2.

Router nodes 200 transfer the packets to other router nodes in accordance with destination information of the packets that were passed from master adapters 1000-1-1000-*n*. As long as slave cores 20-1-20-*m* are not connected to an adjacent router node, these packets arrive at router nodes 200 by way of various intermediate router node groups in Step 3.

Router nodes 200 determine by means of the destination information of the packets that packets are to be processed by slave cores 20-1-20-*m* that are connected to the router nodes. Router nodes 200 then pass the packets to slave adapters 2000-1-2000-*m* in Step 4.

Slave adapters 2000-1-2000-*m* carry out the analysis and development of packets that have been passed from router nodes 200 and thus convert the packets to access requests to slave cores 20-1-20-*m* and then publish access to slave cores 20-1-20-*m* in Step 5.

Figure 4:
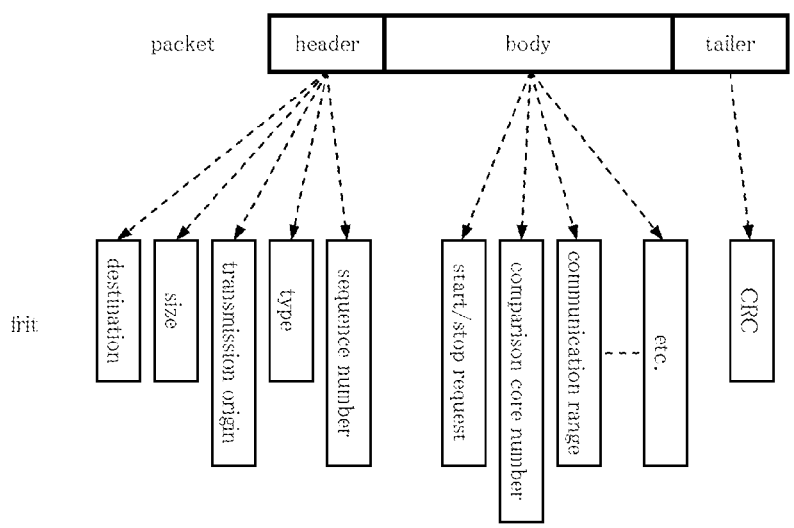
FIG. 4 shows an example of the configuration of a transferred packet in the interconnected network shown in FIG. 2.

FIG. 4 shows an example of the configuration of a packet that is transferred within interconnected network 100 shown in FIG. 2.

Referring to FIG. 4, a packet is made up from three parts: the header, which is the control information of the router nodes; the body, which is made up from access information to cores; and the tailer, which guarantees validity of the packet. Each of these parts is divided into still smaller units referred to as flits during transmission between router nodes.

For example, the header is divided into flits made up from destination node, packet size, transmission origin core, packet type, and a sequence number for guaranteeing the order relation of a request.

As for the body, although various structures can be considered depending on the type of request, explanation here regards requests for start or stop of comparison. These requests are made up from information indicating whether the packet is a comparison start request or a comparison stop request, information such as a comparison core number showing the master core with which comparison is to be carried out, and information regarding the comparison range regarding the address range for which comparison is to be carried out.

The tailer is divided into flits composed of CRC (Cyclic Redundancy Code) of the entire packet.

This packet and flit construction is only an example, and any construction is possible that accords with the specifications of the router nodes that make up the interconnected network.

Figure 5:
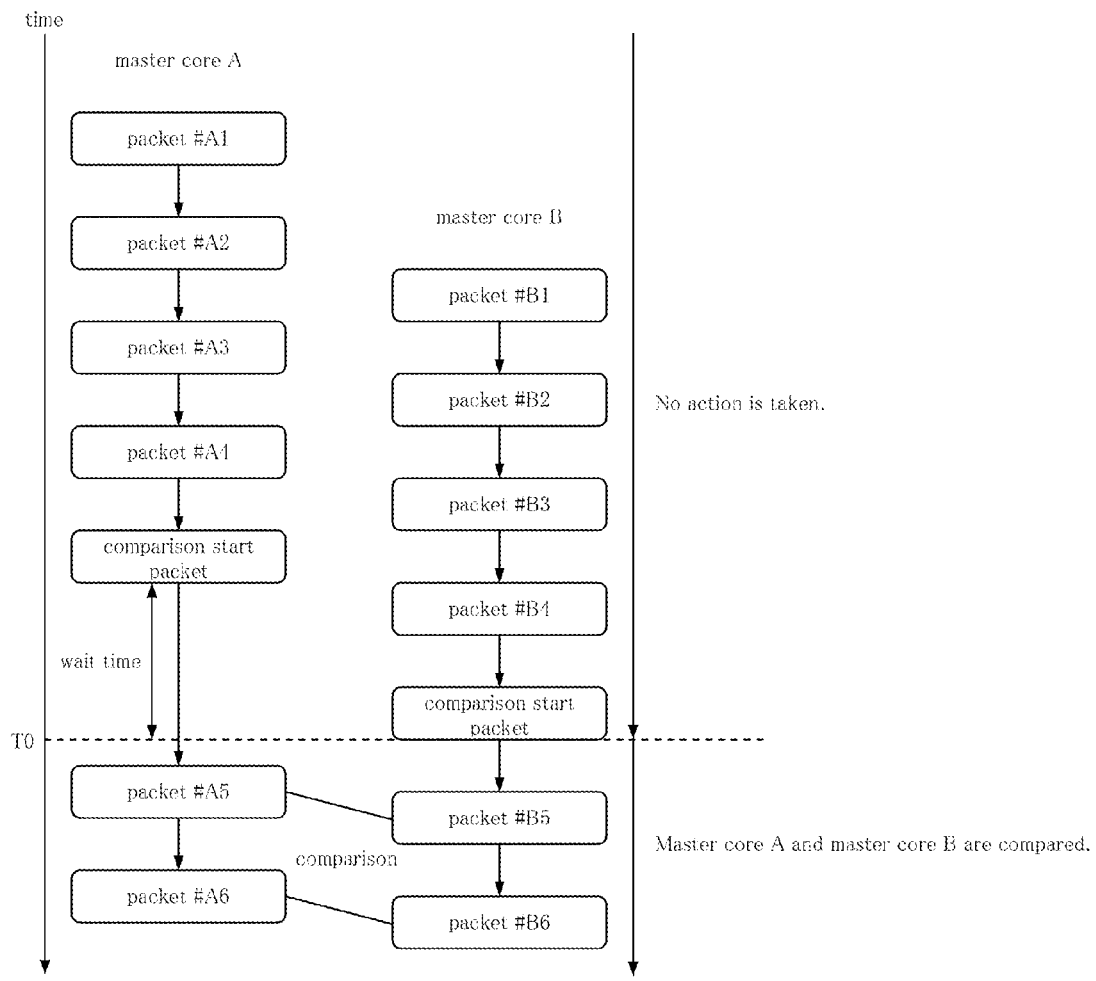
FIG. 5 is an explanatory view showing an example of the operation of starting comparison in the slave adapter shown in FIG. 2.

FIG. 5 is an explanatory view of an example of the operation of starting comparison in slave adapters 2000-1-2000-*m* shown in FIG. 2.

FIG. 5 shows the implementation of the comparison start operation for requests from master core A that is the first master core and master core B that is the second master core that are received in slave adapters 2000-1-2000-*m*. In this case, master core A and master core B are any master cores among master cores 10-1-10-*n*.

Master core A transmits packets #A1-A4, which are the first access request, and then transmits comparison start packets that are the first comparison start request for carrying out comparison of packets with master core B. Not having received packets for starting comparison with master core A from master core B, slave adapters 2000-1-2000-*m* that have received this request wait for an access request from master core B.

Meanwhile, packets #B1-B4, which are the second access request that is transmitted from master core B, are received, following which comparison start packets, which are the second comparison start request for comparing packets with master core A, are transmitted from master core B, whereupon synchronization is realized at time T0. Subsequent packets are subjected to comparison matching verification for each packet in these slave adapters 2000-1-2000-*m*. Comparison is therefore possible even when the arrival of packets is not simultaneous.

Accordingly, each of packet #A5 of master core A and packet #B5 of master core B as well as packet #A6 of master core A and packet #B6 of master core B are compared. If, as a result of comparison, the packets match, access is permitted, but otherwise, a recovery request is returned.

In this way, slave adapters 2000-1-2000-*m* are able to use comparison start packets to establish synchronization of requests among master cores 10-1-10-*n* on slave adapters 2000-1-2000-*m* and cause transition to the high-reliability mode among any of master cores 10-1-10-*n*.

Figure 6:
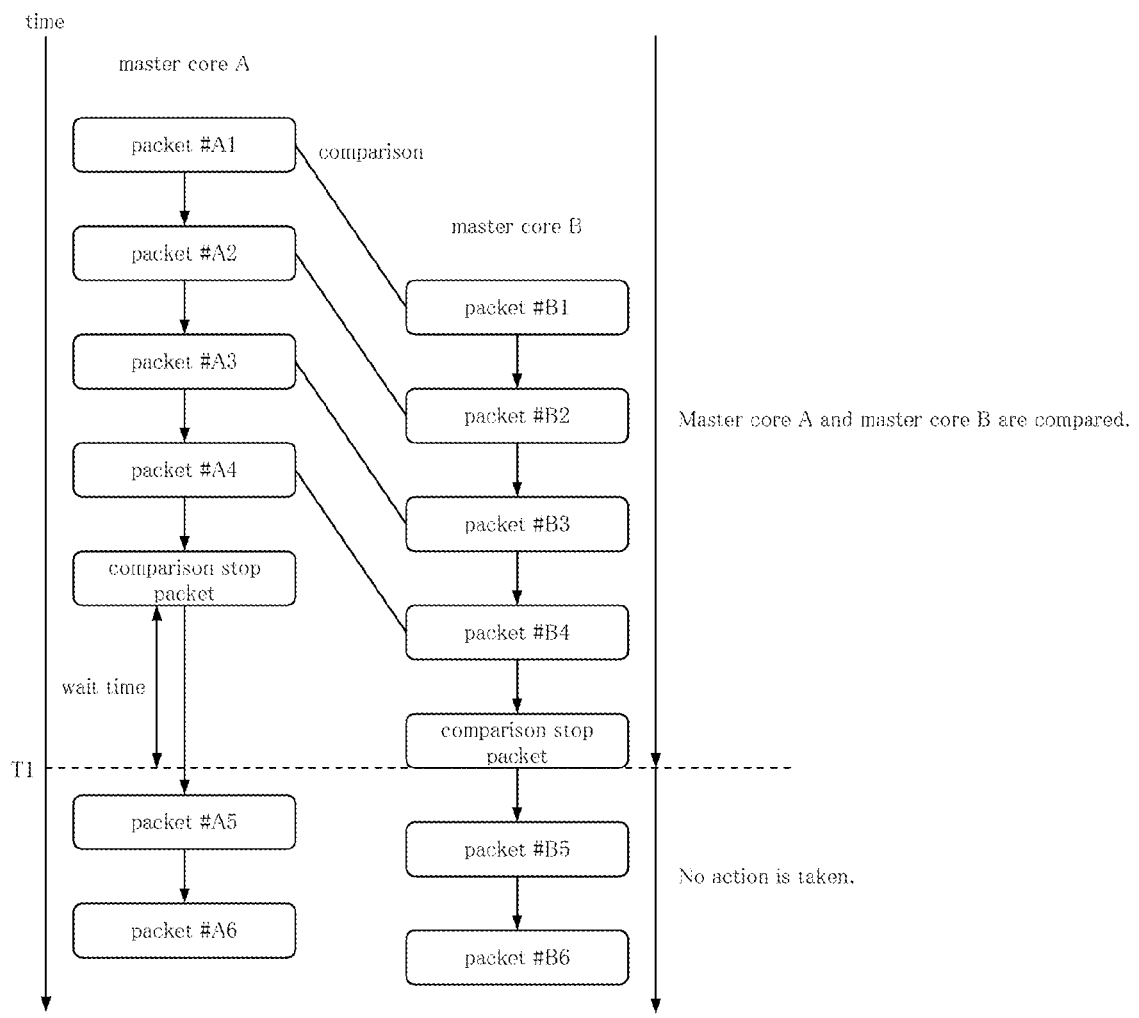
FIG. 6 is an explanatory view of an example of the operation of stopping comparison in the slave adapter shown in FIG. 2.

FIG. 6 is an explanatory view of an example of the comparison stop operation in slave adapters 2000-1-2000-*m* shown in FIG. 2.

FIG. 6 shows the implementation of the comparison stop operation for requests from master core A and master core B that are received in slave adapters 2000-1-2000-*m*. Here, master core A and master core B are any master cores among master cores 10-1-10-*n*.

Master core A transmits packets #A1-A4. Master core B transmits packets #B1-B4. Slave adapters 2000-1-2000-*m* compare packets that correspond to a corresponding order relation (packet #A1 and packet #B1, packet #A2 and packet #B2, packet #A3 and packet #B3, and packet #A4 and packet #B4).

The first comparison stop request transmitted from master core A, which is packets for stopping comparison with master core B, is then received. Not having received packets from master core B to stop comparison with master core A, slave adapters 2000-1-2000-*m* that have received the comparison stop packets with master core B from master core A, wait for an access request from master core B. Upon subsequently receiving the second comparison stop request, which is packets for stopping comparison with master core A transmitted from master core B, synchronization is carried out at time T1. Subsequent packets are not subjected to comparison matching verification in these slave adapters 2000-1-2000-*m*.

Accordingly, packets #A5 and A6 from master core A and packets #B5 and B6 from master core B are independently referenced.

In this way, slave adapters 2000-1-20000-*m* are able to use comparison stop packets to establish synchronization of requests among master cores 10-1-10-*n* on slave adapters 2000-1-2000-*m* and cause any of master cores 10-1-10-*n* that are in the high-reliability mode to transition to the high-performance mode that is not required for comparison.

Explanation next regards the connection mode, the operations, and internal configuration of master adapters 1000-1-1000-*n*. Here, the connection mode, operation, and internal configuration of master adapter 1000-1 are explained as an example. The connection mode, operation, and internal configuration of master adapters 1000-2-1000-*n* are the same as the connection mode, operation, and internal configuration of master adapter 1000-1.

Figure 7:
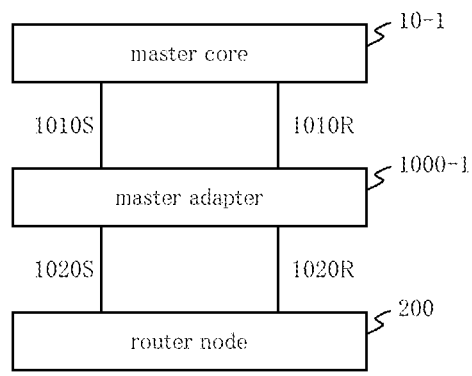
FIG. 7 shows an example of the mode of connection of the master adapter shown in FIG. 2.

FIG. 7 shows an example of the connection mode of master adapter 1000-1 shown in FIG. 2.

Referring to FIG. 7, master adapter 1000-1 is connected to master core 10-1 by way of master core transmission signal 1010S from master core 10-1 and master core reception signal 1010R to master core 10-1. Master adapter 1000-1 is further connected to router node 200 by way of master adapter transmission signal 1020S transmitted to router node 200 and master adapter reception signal 1020R received from router node 200.

Here, access information such as reading and writing and response information corresponding to this reading and writing from master core 10-1 are conveyed by master core transmission signal 1010S and master core reception signal 1010R. On the other hand, packets are exchanged by master adapter transmission signal 1020S and master adapter reception signal 1020R.

Figure 8:
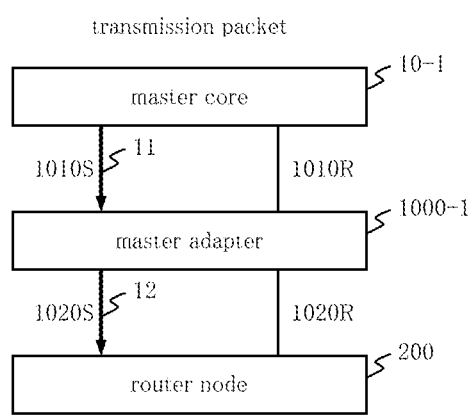
FIG. 8 is an explanatory view of an example of the packet transmission operation of the master adapter in the mode shown in FIG. 7.

FIG. 8 is an explanatory view of an example of the packet transmission operation of master adapter 1000-1 in the configuration shown in FIG. 7. In this example, processing of an access request from master core 10-1 is described.

Master adapter 1000-1 receives an access request from master core 10-1 in Step 11.

Master adapter 1000-1 then converts the received access request to packets and transmits them to router node 200 in Step 12.

Figure 9:
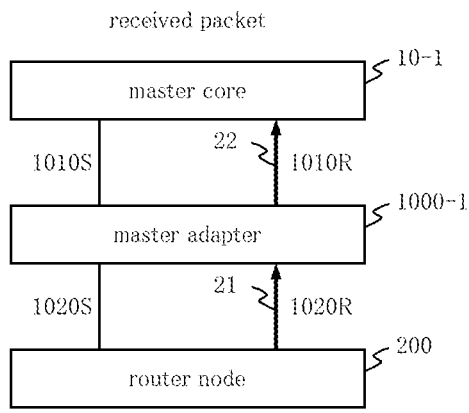
FIG. 9 is an explanatory view of an example of the packet reception operation in the master adapter in the mode shown in FIG. 7.

FIG. 9 is an explanatory view of an example of the packet reception operation of master adapter 1000-1 in the configuration shown in FIG. 7. In this example, the process of responding to an access request from master core 10-1 is described.

Master adapter 1000-1 receives packets from router node 200 in Step 21.

Master adapter 1000-1 then recognizes that these packets are a response process to master core 10-1, and as a result, converts the packets to response information and transmits the information to master core 10-1 in Step 22.

Figure 10:
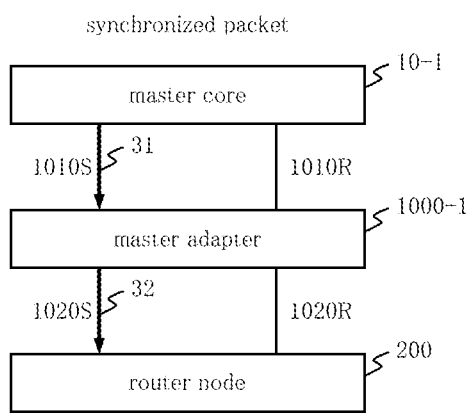
FIG. 10 is an explanatory view of an example of the synchronous packet transmission operation of the master adapter in the mode shown in FIG. 7.

FIG. 10 is an explanatory view of an example of the synchronous packet transmission operation of master adapter 1000-1 in the configuration shown in FIG. 7. In this example, the process of a request to start comparison and a request to stop comparison from master core 10-1 is described.

A comparison start request and comparison stop request may be determined by referring to a memory map for supplying a control request to the relevant slave core or may be determined by a special processor command. In either case, determination is realized by a notification means.

In addition, the designation of whether a comparison start or a comparison stop is to be carried out for all slave cores or a comparison start or comparison stop is to be carried out for only a particular specific address range may be set in advance in a control register of master adapter 1000-1, may be held in, for example, a table, or may be designated from master core 10-1. In any case, designation is assumed to be realized by a notification means.

Master adapter 1000-1 receives a comparison start request or a comparison stop request for slave cores 20-1-20-*m* from master core 10-1 in Step 31.

Master adapter 1000-1 then converts this access request to packets (see FIG. 4) and transmits them to router nodes 200 as synchronized packets. The router nodes deliver the packets to the relevant slave cores 20-1-20-*m*.

Figure 11:
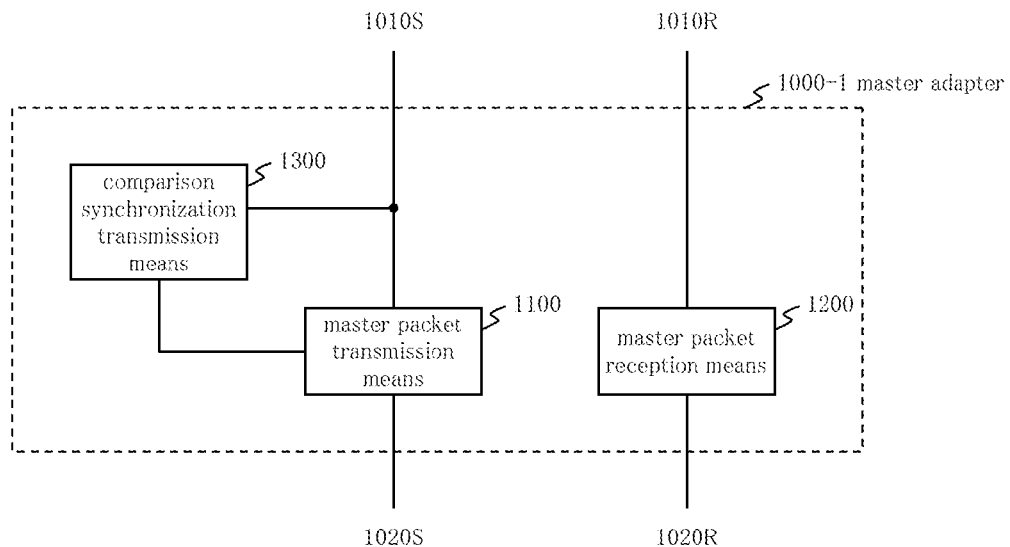
FIG. 11 shows the typical internal configuration of a master adapter shown in FIG. 2.

FIG. 11 shows the typical internal configuration of master adapter 1000-1 shown in FIG. 2.

Referring to FIG. 11, master adapter 1000-1 includes master packet transmission means 1100, master packet reception means 1200, and comparison synchronization transmission means 1300.

Master packet transmission means 1100 converts access from master core 10-1 to packets and transmits them to router node 200.

Master packet reception means 1200 receives packets from router node 200 and converts the packets to a response to master core 10-1.

Comparison synchronization transmission means 1300 generates request packets of a comparison start or comparison stop. Comparison synchronization transmission means 1300 is connected to master packet transmission means 1100 and master core transmission signal 1010S.

Figure 12:
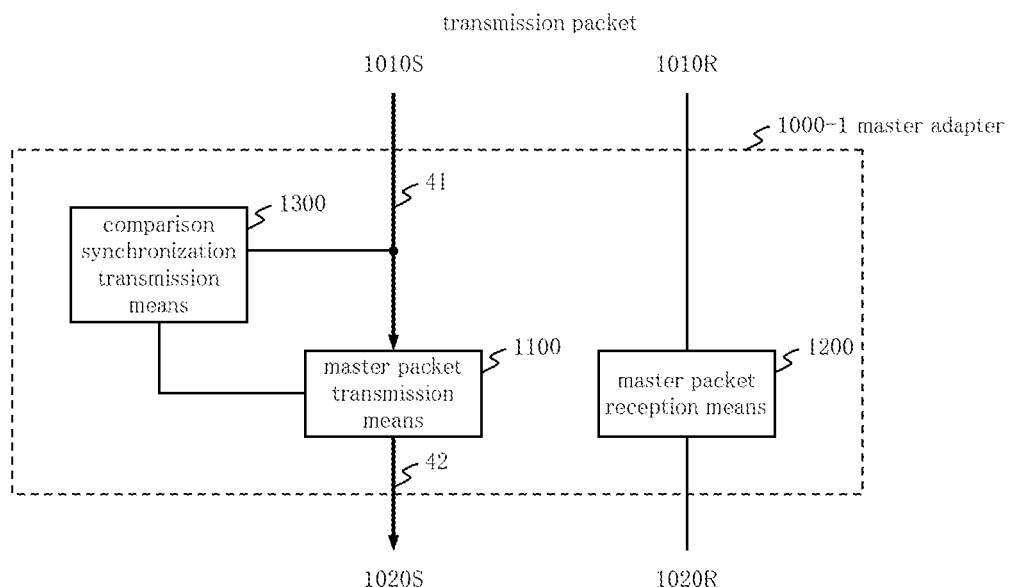
FIG. 12 is an explanatory view of an example of the internal operation of packet transmission of the master adapter of the configuration shown in FIG. 11.

FIG. 12 is an explanatory view of an example of the internal operation of packet transmission of master adapter 1000-1 in the configuration shown in FIG. 11. In this example, the processing of an access request from master core 10-1 to slave core 20-1-20-*m* is described.

Master packet transmission means 1100 receives an access request from master core 10-1 to slave cores 20-1-20-*m* by way of master core transmission signal 1010S in Step 41.

Master packet transmission means 1100 then converts the received access request to packets and transmits them to router node 200 in Step 42.

Figure 13:
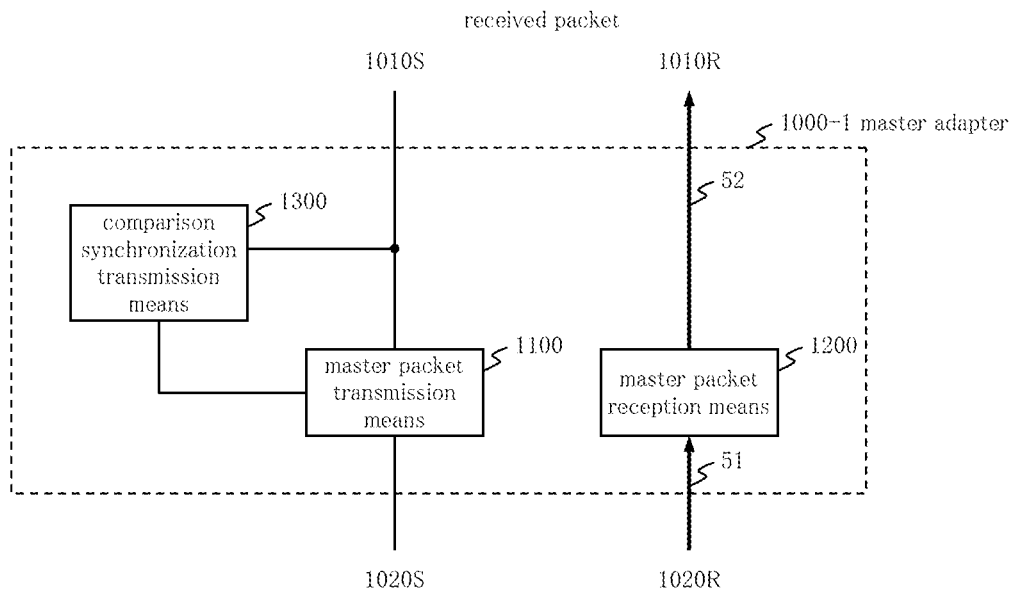
FIG. 13 is an explanatory view of an example of the internal operation of packet reception of the master adapter of the configuration shown in FIG. 11.

FIG. 13 is an explanatory view of an example of the internal operation of packet reception of master adapter 1000-1 in the configuration shown in FIG. 11. In this example, the process of access response to master core 10-1 from slave cores 20-1-20-*m* is described.

Master packet reception means 1200 receives packets by way of master adapter reception signal 1020R in Step 51.

Master packet reception means 1200 then converts the received packets to a response to master core 10-1 and passes the packets to master core 10-1 by way of master core reception signal 1010R in Step 52.

Figure 14:
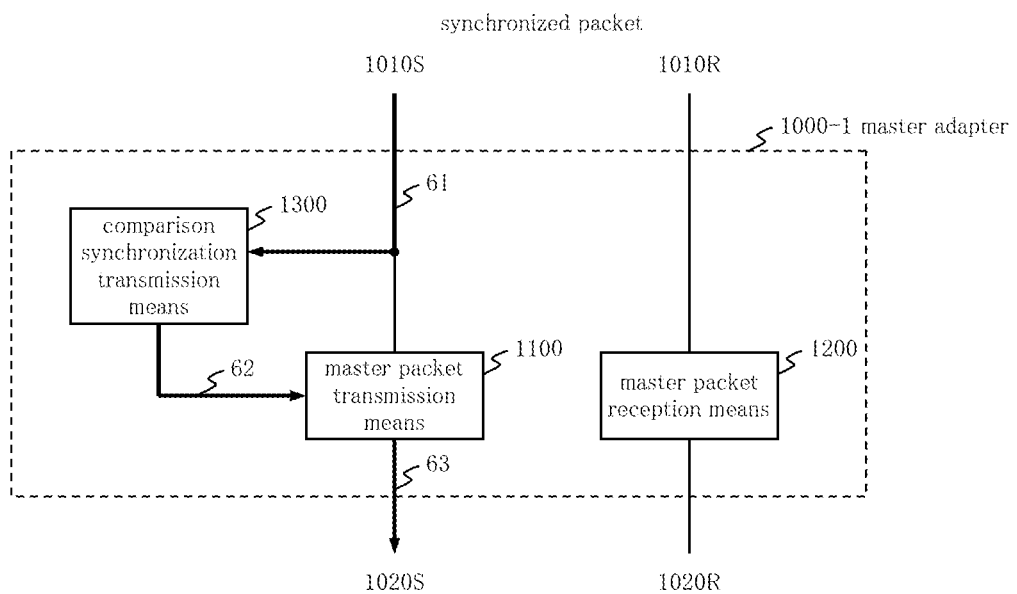
FIG. 14 is an explanatory view of an example of the internal operation of synchronous packet transmission of the master adapter in the configuration shown in FIG. 11.

FIG. 14 is an explanatory view of an example of the internal operation of the synchronous packet transmission of master adapter 1000-1 in the configuration shown in FIG. 11. In this example, processing of a request from master core 10-1 to start comparison or stop comparison is described.

Comparison synchronization transmission means 1300 recognizes that the access request received by way of master core transmission signal 1010S in Step 61 is an access request to start comparison or stop comparison with another master core.

Comparison synchronization transmission means 1300 then, based on the recognized access request, passes packets for the comparison start or comparison stop to master packet transmission means 1100 in Step 62.

Master packet transmission means 1100 then transmits the packets that were passed from comparison synchronization transmission means 1300 to router node 200 by way of master adapter transmission signal 1020S in Step 63.

The comparison start or comparison stop request from master core 10-1 may be determined from the relevant memory map to determine which of master cores 10-2-10-*n* the request pertains to. Alternatively, this information may be set in advance in a register provided by comparison synchronization transmission means 1300 and then determined by writing to a transmission control register from master core 10-1. In any case, any method may be used as long as notification from master core 10-1 can be received.

At the time of this notification, packets transmitted to a plurality of slave cores 20-1-20-*m* may be copied simultaneously, or master core 10-1 may transmit requests sequentially. Whether simultaneous or sequential, a time discrepancy will occur on the network, but such an option is also possible because this discrepancy can be eliminated by synchronization on the side of slave cores 20-1-20-*m*.

Explanation next regards the connection mode, operation, and internal configuration of slave adapters 2000-1-2000-*m*. Here, the connection mode, operation and internal configuration of slave adapter 2000-1 are described as an example. The connection mode, operations and internal configuration of slave adapters 2000-2-2000-*m* are identical to the connection mode, operation, and internal configuration of slave adapter 2000-1.

Figure 15:
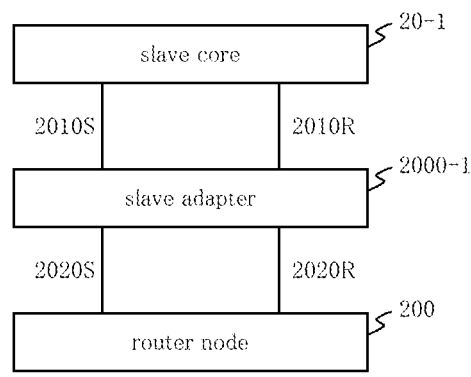
FIG. 15 shows an example of the mode of connection of a slave adapter shown in FIG. 2.

FIG. 15 shows an example of the connection mode of slave adapter 2000-1 shown in FIG. 2.

Referring to FIG. 15, slave adapter 2000-1 is connected to slave core 20-1 by way of slave core transmission signal 2010S from slave core 20-1 and slave core reception signal 2010R to slave core 20-1. In addition, slave adapter 2000-1 is connected to router node 200 by way of slave adapter transmission signal 2020S to router node 200 and to slave adapter reception signal 2020R from router node 200.

Here, access information such as reading/writing from slave core 20-1 and response information corresponding to this reading/writing are conveyed by slave core transmission signal 2010S and slave core reception signal 2010R. On the other hand, packets are exchanged by slave adapter transmission signal 2020S and slave adapter reception signal 2020R.

Figure 16:
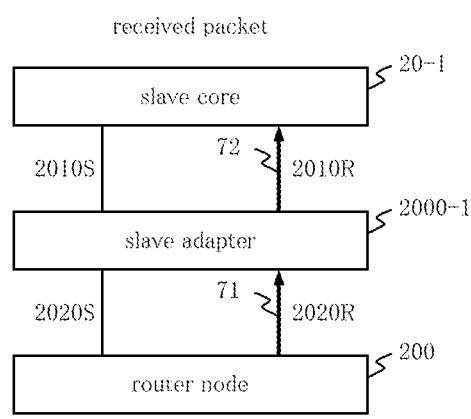
FIG. 16 is an explanatory view of an example of the packet reception operation of the slave adapter of the configuration shown in FIG. 15.

FIG. 16 is an explanatory view of an example of the packet reception operation of slave adapter 2000-1 in the configuration shown in FIG. 15. In this example, processing of an access request to slave core 20-1 is described.

Slave adapter 2000-1 receives access request packets transmitted to slave core 20-1 in Step 71.

Slave adapter 2000-1 recognizes that the received packets are a normal access process directed to slave core 20-1, and as a result, converts the packets to an access request and transmits the access request to slave core 20-1 in Step 72.

Figure 17:
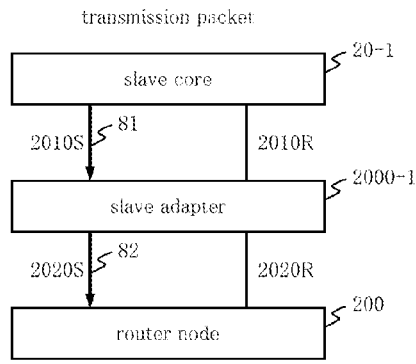
FIG. 17 is an explanatory view of an example of the packet transmission operation of the slave adapter of the configuration shown in FIG. 15.

FIG. 17 is an explanatory view of an example of the packet transmission operation of slave adapter 2000-1 in the configuration shown in FIG. 15. In this example, processing for an access response from slave core 20-1 is described.

Slave adapter 2000-1 receives an access response from slave core 20-1 in Step 81.

Slave adapter 2000-1 then converts the access response to packets and transmits the packets to router node 200 in Step 82.

Here, the information of master cores 10-1-10-*n* that are the response destinations for the access response can be known because the access request has already passed through slave adapter 2000-1, and the response destination is clear due to the information that is stored there. This type of function is an extremely basic function in a system having an interconnected network, and further mention is therefore omitted.

Figure 18:
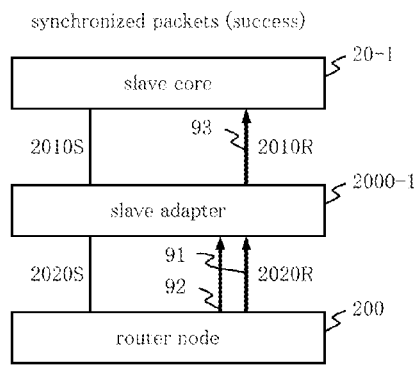
FIG. 18 is an explanatory view of an example of the synchronous packet reception operation of the slave adapter of the mode shown in FIG. 15.

FIG. 18 is an explanatory view of an example of the synchronous packet reception operation of slave adapter 2000-1 in the mode shown in FIG. 15. In this example, an example of the success of the comparison processing to slave core 20-1 from master cores 10-1 and 10-*n* is described.

Slave adapter 2000-1 receives a request to access slave core 20-1 from master core 10-1 in Step 91. Slave adapter 2000-1 recognizes that this request is access with the object of comparison and waits for an access request from master core 10-*n* that is the object of comparison.

Slave adapter 2000-1 subsequently receives a request to access slave core 20-1 from master core 10-*n* in Step 92. Slave adapter 2000-1 recognizes that this request is access with the object of comparison with master core 10-1 and further determines that it is an access request from master core 10-*n* that is the other object of comparison. At this time, the accesses are compared with each other. For example, the addresses are compared in the case of a read request, and the address and data are compared in the case of a write request. In the case of a read request, comparison may be carried out not only for the read address but also for the data following reading.

Slave adapter 2000-1 then, as a result of comparison, determines matching, and consequently passes the access request to slave core 20-1 by way of slave core reception signal 2010R in Step 93.

Figure 19:
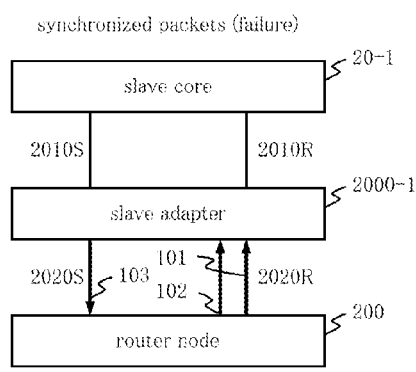
FIG. 19 is an explanatory view of another example of the synchronous packet reception operation of the slave adapter of the configuration shown in FIG. 15.

FIG. 19 is an explanatory view of another example of the synchronous packet reception operation of slave adapter 2000-1 in the configuration shown in FIG. 15. In this example, an example of a failure of the comparison process to slave core 20-1 from master cores 10-1 and 10-*n* is described.

Slave adapter 2000-1 receives a request to access slave core 20-1 from master core 10-1 in Step 101. Slave adapter 2000-1 recognizes that this request is access with the object of comparison and waits for an access request from master core 10-*n* that is the object of comparison.

Slave adapter 2000-1 subsequently receives a request to access slave core 20-1 from master core 10-*n* in Step 102. Slave adapter 2000-1 recognizes that this request is access with the object of comparison with master core 10-1, and further determines that this is an access request from master core 10-*n* that is the other object of comparison. At this time, the accesses are compared with each other. For example, the addresses are compared in the case of a read request, and the addresses and data are compared in the case of a write request. In addition, in the case of a read request, comparison may be carried out not only for the read address, but also for the data after reading.

Slave adapter 2000-1 determines, as a result of comparison, that the accesses are different, and consequently transmits an error response packet to master cores 10-1 and 10-*n*, which are the objects of comparison, by way of slave adapter transmission signal 2020S in Step 103.

Figure 20:
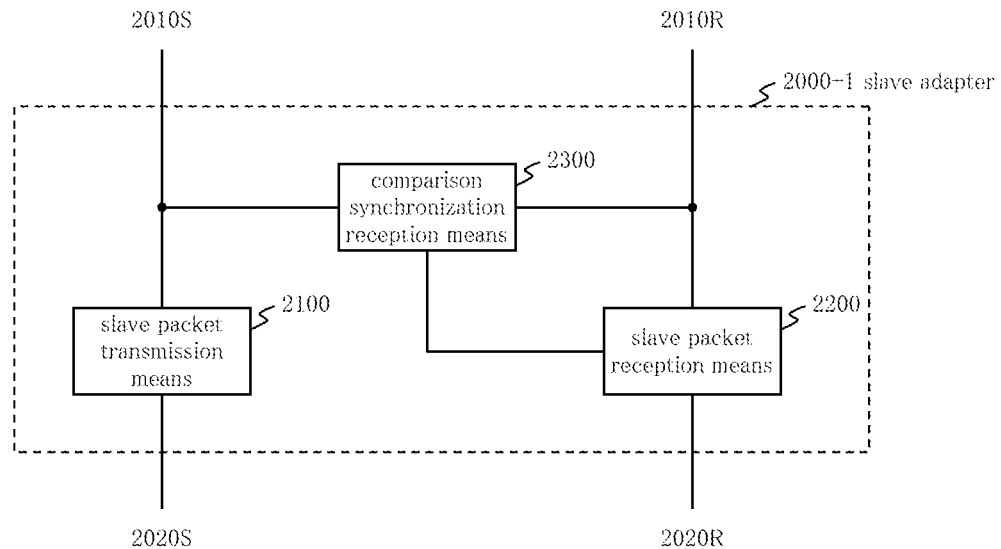
FIG. 20 shows the typical internal configuration of a slave adapter shown in FIG. 2.

FIG. 20 shows the typical internal configuration of slave adapter 2000-1 shown in FIG. 2.

Referring to FIG. 20, slave adapter 2000-1 includes slave packet transmission means 2100, slave packet reception means 2200, and comparison synchronization reception means 2300.

Slave packet transmission means 2100 converts a response from slave core 20-1 to packets and transmits the packets to router node 200.

Slave packet reception means 2200 receives packets from router node 200 and converts the packets to access slave core 20-1.

Comparison synchronization reception means 2300 compares packets from master cores 10-1-10-$n$ that are the objects of comparison.

Slave packet reception means 2200 further has the functions of, in concert with comparison synchronization reception means 2300, passing packets from master cores 10-1-10-$n$ that are the objects of comparison to comparison synchronization reception means 2300. The establishment of comparison starts and comparison stops can be determined by the passage of synchronized packets. Alternatively, notification may be received from comparison synchronization reception means 2300. Each of the packets is passed to comparison synchronization reception means 2300 in the order of issue. Sequential numbers that are contained in packet headers can be used to line up to determine this order of issue.

In consideration of these discrepancies in arrival caused by an interconnected network, slave packet reception means 2200 and comparison synchronization reception means 2300 may be provided with a plurality of internal buffers.

Comparison synchronization reception means 2300 synchronizes access to slave core 20-1 by comparison start/stop packets. In other words, the processing of packets having an earlier order of issue than comparison start/stop packets must be already completed, and processing of packets having a later order of issue must start after the implementation of comparison start or comparison stop.

Figure 21:
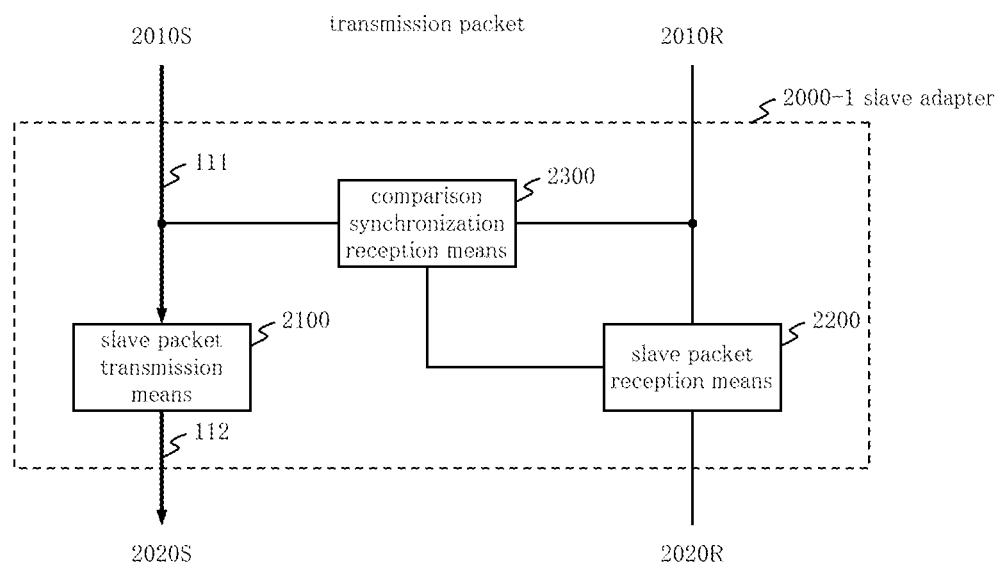
FIG. 21 is an explanatory view of an example of the internal operation of packet transmission of the slave adapter in the configuration shown in FIG. 20.

FIG. 21 is an explanatory view of an example of the internal operation of packet transmission of slave adapter 2000-1 in the configuration shown in FIG. 20. In this example, the processing of an access response from slave core 20-1 is described.

Slave packet transmission means 2100 receives an access response from slave core 20-1 in Step 111.

Slave packet transmission means 2100 then converts the access response to packets and transmits the packets to router node 200 in Step 112.

Here, the information of master cores 10-1-10-$n$ that are the response destinations for the access response is known because the access request has already been transmitted by way of slave packet reception means 2200, and the response destination is ascertained by the information stored in slave packet reception means 2200. This function is an extremely basic function in a system having an interconnected network, and further mention is therefore omitted.

Figure 22:
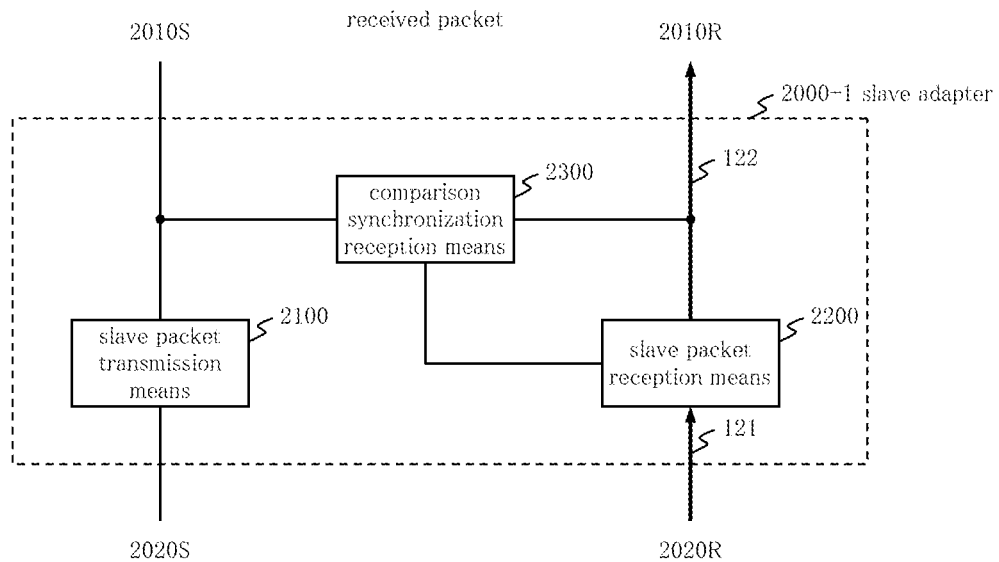
FIG. 22 is an explanatory view of an example of the internal operation of packet reception of the slave adapter of the configuration shown in FIG. 20.

FIG. 22 is an explanatory view of an example of the internal operation of packet reception of slave adapter 2000-1 in the configuration shown in FIG. 20. In this example, the process of a request to access slave core 20-1 is described.

Slave packet reception means 2200 receives a request to access slave core 20-1 in Step 121.

Slave packet reception means 2200 then recognizes that the received packets are a normal process for accessing slave core 20-1, and as a result, converts the packets to an access request and transmits the access request to slave core 20-1 in Step 122.

Figure 23:
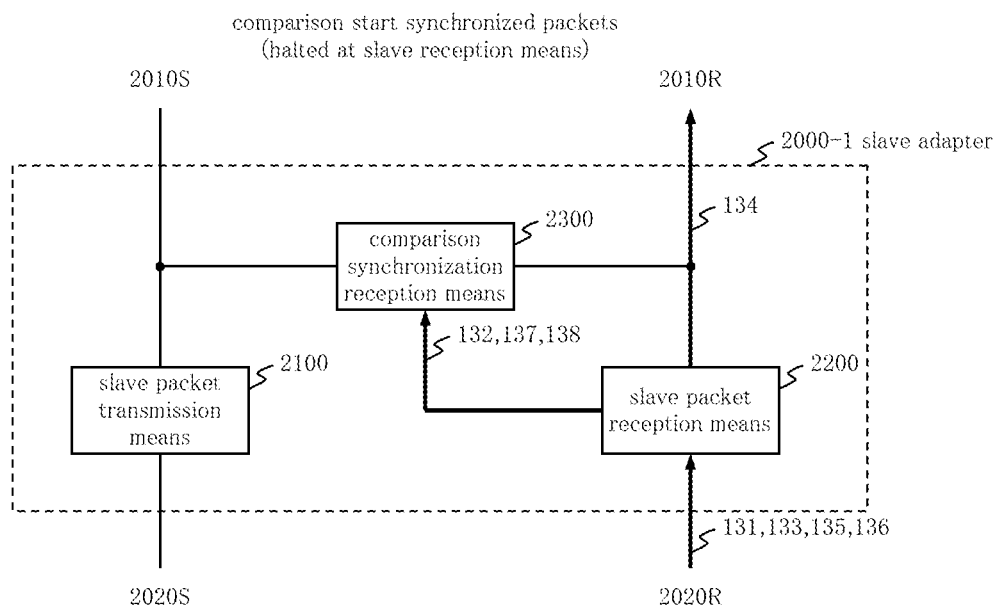
FIG. 23 is an explanatory view of an example of the internal operation of synchronous packet reception at the start of comparison of the slave adapter of the configuration shown in FIG. 20.

FIG. 23 is an explanatory view of an example of the internal operation of a comparison start synchronized packet reception of slave adapter 2000-1 in the configuration shown in FIG. 20.

Slave packet reception means 2200 receives comparison start request packets directed to slave core 20-1 from master core 10-1 that is an object of comparison in Step 131.

Slave packet reception means 2200 then passes the comparison start request packets that were received in Step 131 to comparison synchronization reception means 2300 in Step 132.

Slave packet reception means 2200 further receives access request packets directed to slave core 20-1 from master core 10-$n$ that is the other object of comparison in Step 133.

Slave packet reception means 2200 then converts the access request packets that were received in Step 133 to access information and passes the information to slave core 20-1 in Step 134.

In addition, slave packet reception means 2200 receives access request packets directed to slave core 20-1 from master core 10-1 that is the first object of comparison in Step 135. Because a comparison start request has not been received from master core 10-$n$ that is the other object of comparison, these packets are halted.

Slave packet reception means 2200 then receives comparison start request packets directed to slave core 20-1 from master core 10-$n$ that is the other object of comparison in Step 136.

Slave packet reception means 2200 passes the comparison start request packets that were received in Step 136 to comparison synchronization reception means 2300 in Step 137, whereby comparison synchronization reception means 2300 begins comparison of the access from master core 10-1 and the access from master core 10-$n$.

Slave packet reception means 2200 passes the packets that were previously halted to comparison synchronization reception means 2300 in Step 138.

Figure 24:
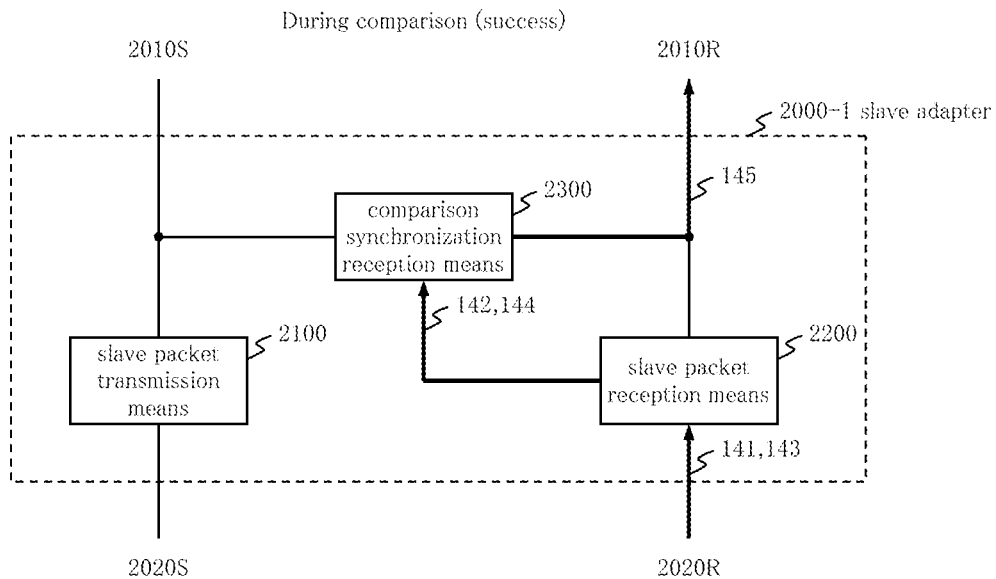
FIG. 24 is an explanatory view of an example of the internal operation at the time of comparison in the slave adapter of the configuration shown in FIG. 20.

FIG. 24 is an explanatory view of an example of the internal operation at the time of comparison of slave adapter 2000-1 in the configuration shown in FIG. 20. In this example, an example is described in which the comparison process of master core 10-1 and master core 10-$n$ is started and success achieved as the result of comparison.

Slave packet reception means 2200 receives access request packets directed to slave core 20-1 from master core 10-1 that is the object of comparison in Step 141.

Slave packet reception means 2200 passes the access request packets that were received in Step 141 to comparison synchronization reception means 2300 in Step 142.

Slave packet reception means 2200 receives access request packets directed to slave core 20-1 from master core 10-$n$ that is the other object of comparison in Step 143.

Slave packet reception means 2200 then passes the access request packets that were received in Step 143 to comparison synchronization reception means 2300 in Step 144.

Comparison synchronization reception means 2300 carries out comparison of the information of each of the packets, and because the packets match, accesses slave core 20-1 in Step 145. In other words, matched packets are converted to an access request and are transmitted to slave core 20-1.

Here, in the case of a read request, comparison of the read data may be additionally carried out. Alternatively, access to slave core 20-1 may be merged into one access, the read data copied, and response made to master cores 10-1 and 10-$n$. In this way, the methods of the related art relating to achieving greater access efficiency and higher data reliability can be combined.

Figure 25:
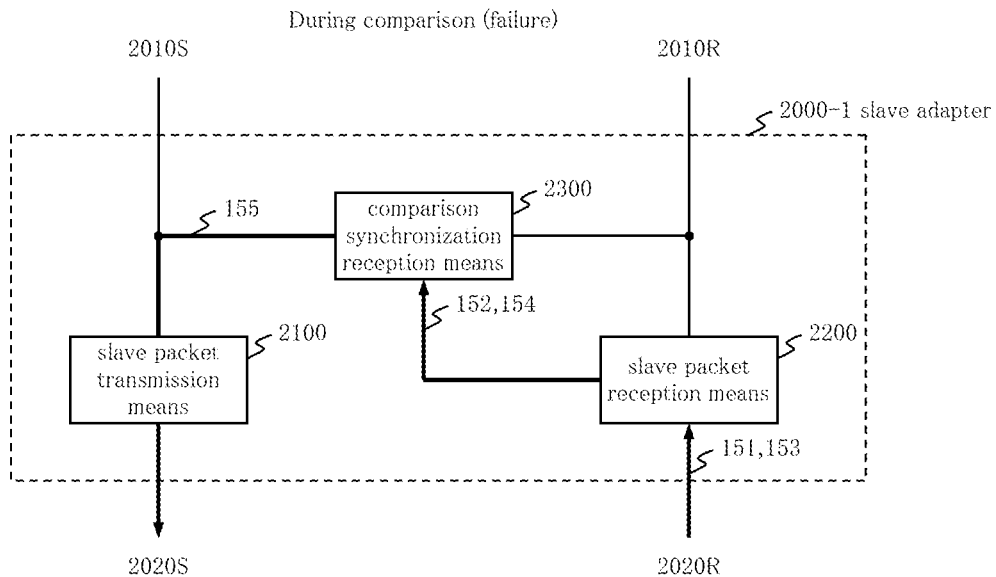
FIG. 25 is an explanatory view of another example of the internal operation at the time of comparison in the slave adapter in the configuration shown in FIG. 20.

FIG. 25 is an explanatory view of another example of the internal operation at the time of comparison of slave adapter 2000-1 in the form shown in FIG. 20. In this example, a case is described in which the comparison process of master core 10-1 and master core 10-*n* is started and in which comparison results in failure.

Slave packet reception means 2200 receives access request packets directed to slave core 20-1 from master core 10-1 that is an object of comparison in Step 151.

Slave packet reception means 2200 then passes the access request packets that were received in Step 151 to comparison synchronization reception means 2300 in Step 152.

Slave packet reception means 2200 further receives access request packets directed to slave core 20-1 from master core 10-*n* that is the other object of comparison in Step 153.

Slave packet reception means 2200 then passes the access request packets that were received in Step 153 to comparison synchronization reception means 2300 in Step 154.

Comparison synchronization reception means 2300 compares the information of each of the packets, and because the information does not match, returns an error response packet to each of master cores 10-1 and 10-*n* by way of slave packet transmission means 2100 in Step 155.

Figure 26:
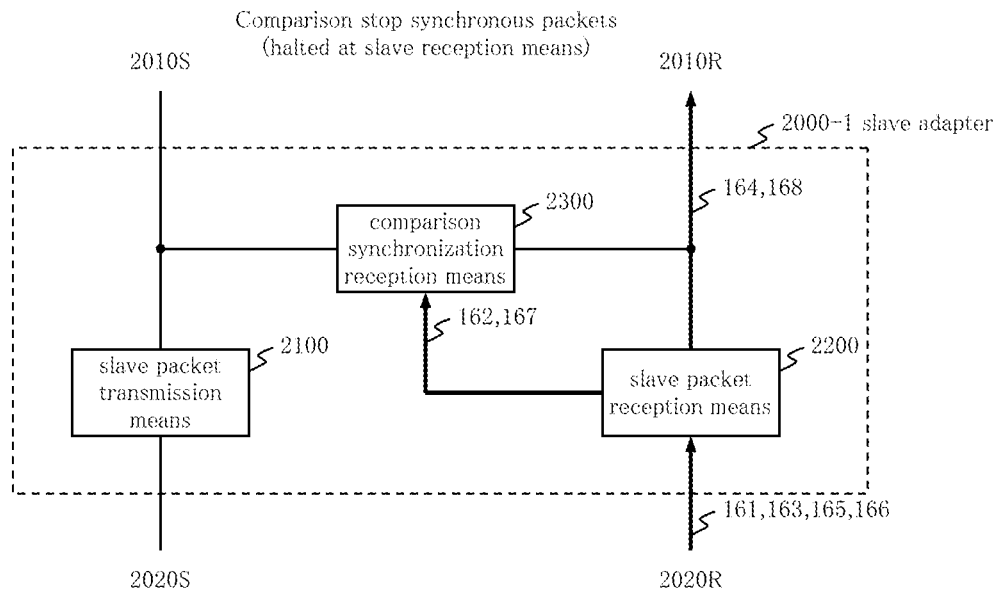
FIG. 26 is an explanatory view of an example of the internal operation of synchronous packet reception when stopping comparison in the slave adapter in the configuration shown in FIG. 20.

FIG. 26 is an explanatory view of an example of the internal operation of comparison stop synchronous packet reception of slave adapter 2000-1 in the configuration shown in FIG. 20. In this example, the comparison stop process of master core 10-1 and master core 10-*n* is described.

Slave packet reception means 2200 receives comparison stop request packets directed to slave core 20-1 from master core 10-1 that is an object of comparison in Step 161.

Slave packet reception means 2200 then passes the comparison stop request packets that were received in Step 161 to comparison synchronization reception means 2300 in Step 162.

Slave packet reception means 2200 further receives access request packets directed to slave core 20-1 from master core 10-*n* that is the other object of comparison in Step 163.

Slave packet reception means 2200 then converts the access request packets that were received in Step 163 to access information and passes the information to slave core 20-1 in Step 164.

Slave packet reception means 2200 receives access request packets directed to slave core 20-1 from master core 10-1 that is the first object of comparison in Step 165. However, because a comparison stop request has not been received from master core 10-*n* that is the other object of comparison, the packets are halted.

Slave packet reception means 2200 then receives comparison stop request packets directed to slave core 20-1 from master core 10-*n* that is another object of comparison in Step 166.

Slave packet reception means 2200 then passes the comparison stop request packets that were received in Step 166 to comparison synchronization reception means 2300, whereby comparison synchronization reception means 2300 stop comparison of the access from master core 10-1 and the access from master core 10-*n* in Step 167.

Slave packet reception means 2200 converts the packets that were previously halted to access information and passes the information to slave core 20-1 in Step 168.

Another Working Example is next described for halting packets on the side of master adapters 1000-1-1000-*n* rather than halting the packets at slave packet reception means 2200.

Figure 27:
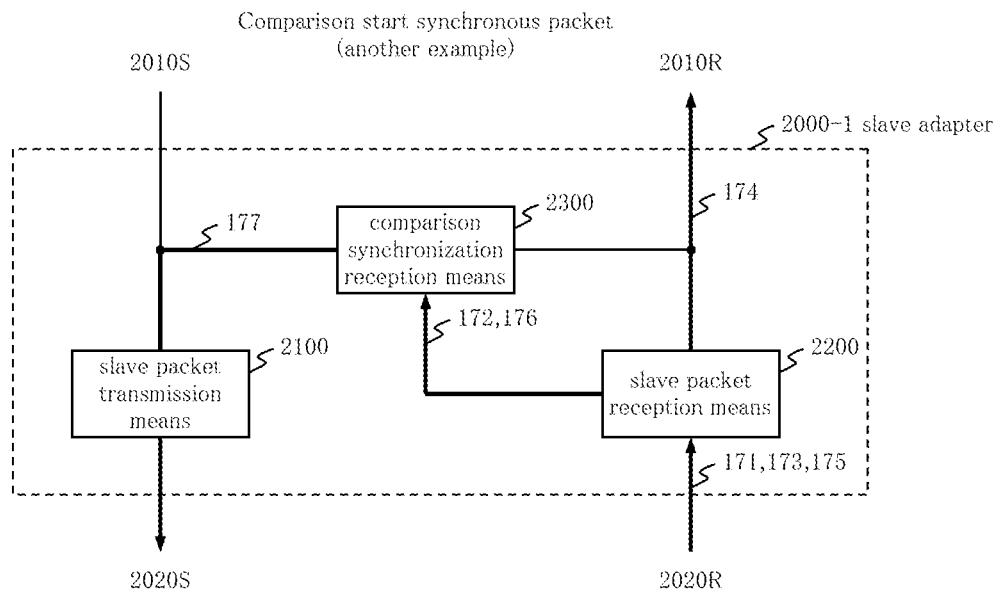
FIG. 27 is an explanatory view of another example of the internal operation of synchronous packet reception when stopping comparison in the slave adapter in the configuration shown in FIG. 20.

FIG. 27 is an explanatory view of another example of the internal operation of comparison start synchronous packet reception of slave adapter 2000-1 in the configuration shown in FIG. 20. In this example, the process of starting comparison of master core 10-1 and master core 10-*n* is described.

Slave packet reception means 2200 receives comparison start request packets directed to slave core 20-1 from master core 10-1 that is an object of comparison in Step 171.

Slave packet reception means 2200 passes the comparison start request packets that were received in Step 171 to comparison synchronization reception means 2300 in Step 172.

Slave packet reception means 2200 receives access request packets directed to slave core 20-1 from master core 10-*n* that is the other object of comparison in Step 173.

Slave packet reception means 2200 converts the access request packets that were received in Step 173 to access information and passes the information to slave core 20-1 in Step 174.

Slave packet reception means 2200 further receives comparison start request packets directed to slave core 20-1 from master core 10-*n* that is the other object of comparison in Step 175.

Slave packet reception means 2200 passes the comparison start request packets that were received in Step 175 to comparison synchronization reception means 2300 in Step 176, whereby comparison synchronization reception means 2300 starts comparison of the access from master core 10-1 and the access from master core 10-*n*.

In Step 177, slave packet reception means 2200 then notifies master adapters 1000-1 and 1000-*n* of master cores 10-1 and 10-*n* by way of slave packet transmission means 2100 that preparations are completed for the start of comparison.

Figure 28:
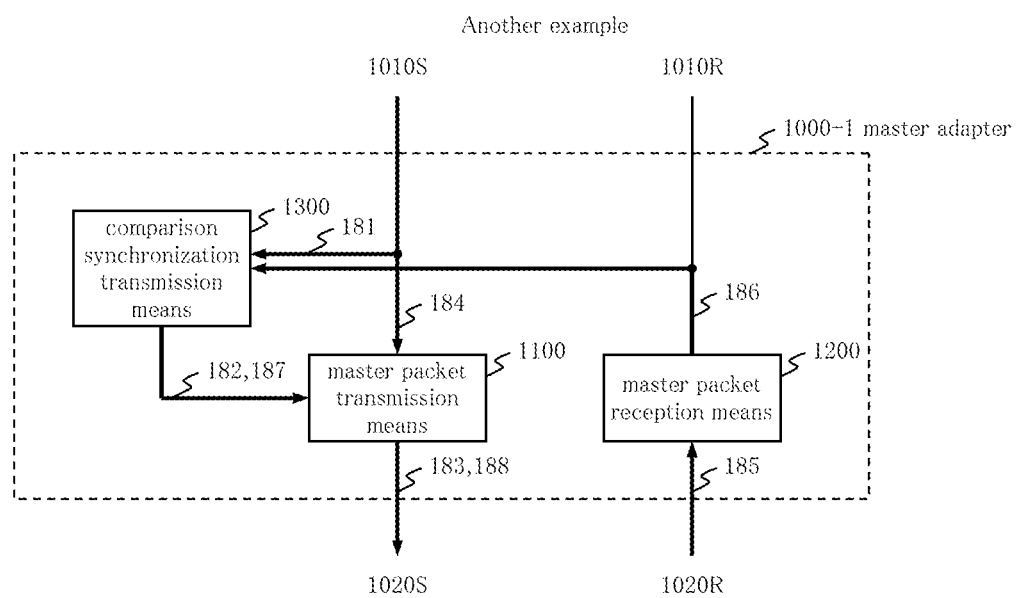
FIG. 28 is an explanatory view of an example of the comparison operation in the master adapter in the configuration shown in FIG. 11.

FIG. 28 is an explanatory view of an example of the comparison operation in master adapter 1000-1 in the configuration shown in FIG. 11. In this example, the comparison start process of master core 10-1 and master core 10-*n* is described.

Comparison synchronization transmission means 1300 receives access of a comparison start request from master core 10-1 in Step 181.

Comparison synchronization transmission means 1300, having received the comparison start request, generates comparison start request packets directed to the corresponding slave core 20-1 and passes the comparison start request packets to master packet transmission means 1100 in Step 182.

Master packet transmission means 1100 thereupon transmits the comparison start request packets that were passed in Step 182 to router node 200 in Step 183.

Master packet transmission means 1100 further receives an access request from master core 10-1 in Step 184. However, because there is no notification of comparison start preparation from the relevant slave core 20-1, the access request is halted here.

On the other hand, master packet reception means 1200 receives comparison start preparation notification packets from slave core 20-1 in Step 185.

Master packet reception means 1200, having received the comparison start preparation notification packets, notifies comparison synchronization transmission means 1300 in Step 186 that the received packets are comparison start preparation notification packets.

Comparison synchronization transmission means 1300, having received notification in Step 186, determines which of slave cores 20-1-20-*m* have been prepared for comparison, and notifies the determination results to master packet transmission means 1100 in Step 187.

Master packet transmission means 1100 then determines that the destination of the packets that were previously halted is slave core 20-1 that has completed comparison preparation and carries out packet transmission in Step 188.

Apart from the above-described example, the comparison start preparation notification packets may also be reported directly to master packet transmission means 1100 and not by way of comparison synchronization transmission means 1300. In any case, any configuration may be adopted as long as continued access that is issued until start of comparison can be halted on the side of master core 10-1 and this access then issued by means of preparation notification from slave core 20-1.

Figure 29:
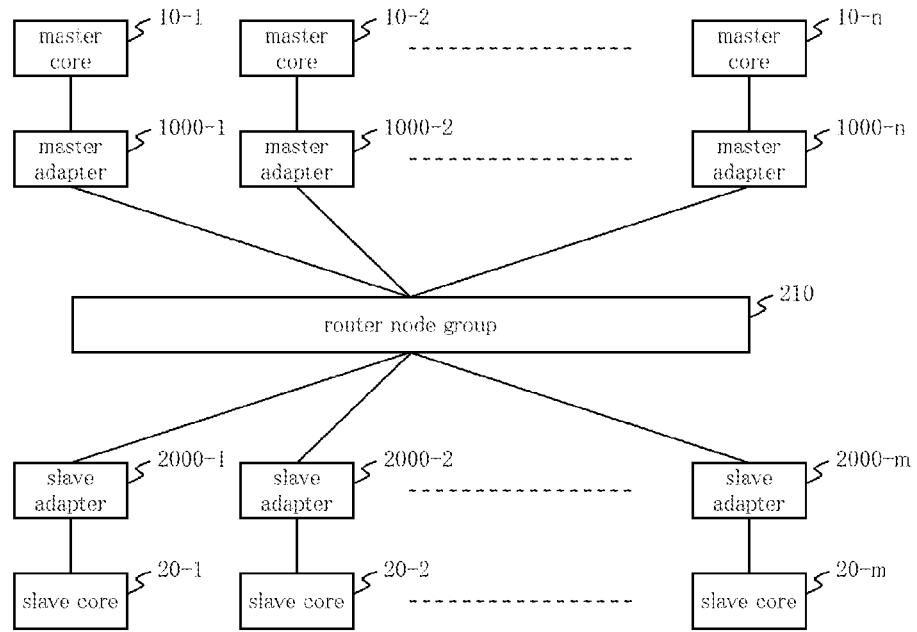
FIG. 29 shows the second embodiment of the information processor of the present invention.

FIG. 29 shows the second embodiment of the information processor of the present invention.

Referring to FIG. 29, a configuration is shown in which all router nodes 200 shown in FIG. 2 are, for the sake of explanation, consolidated as router node group 210. Accordingly, the configuration in the first embodiment shown in FIG. 2 does not change.

Figure 30:
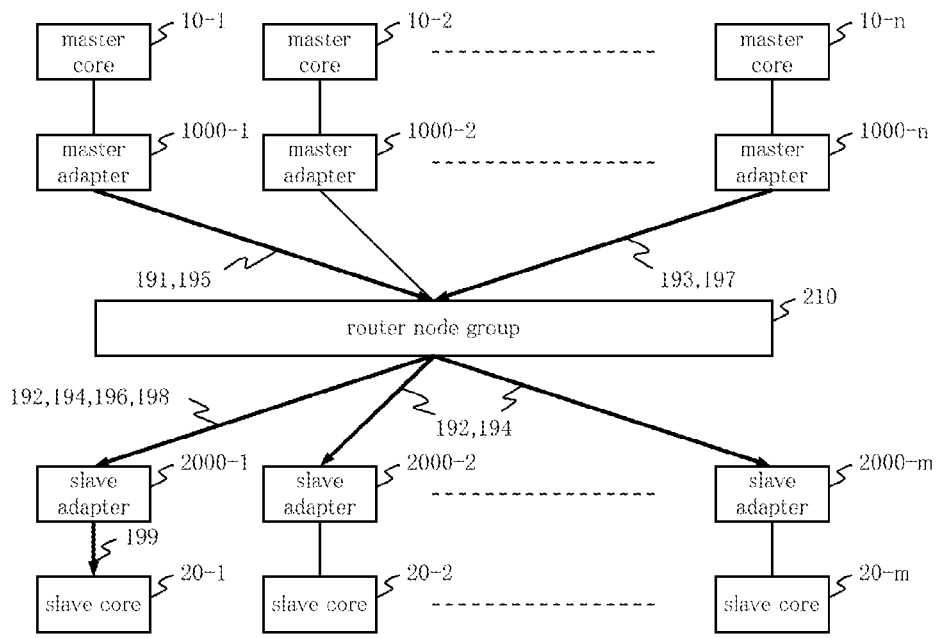
FIG. 30 is an explanatory view of an example of the operation when starting comparison in the information processor in the configuration shown in FIG. 29.

FIG. 30 is an explanatory view of an example of the comparison start operation of the information processor in the configuration shown in FIG. 29. In this example, the comparison start process of master core 10-1 and master core 10-n is described.

Master adapter 1000-1 receives a comparison start request from master core 10-1 and transmits a request to start comparison with master core 10-n to all slave adapters 2000-1-2000-m by way of router node group 210 in Step 191.

Router node group 210 broadcasts the request to start comparison master core 10-n that was received from master core 10-1 to all slave adapters 2000-1-2000-m in Step 192. Here, all slave adapters 2000-1-2000-m await a request to start comparison with master core 10-1 from master core 10-n.

On the other hand, master adapter 1000-n receives a request to start comparison from master core 10-n and transmits the request to start comparison with master core 10-1 to all slave adapters 2000-1-2000-m by way of router node group 210 in Step 193.

Router node group 210 broadcasts the request to start comparison with master core 10-1 that was received from master core 10-n to all slave adapters 2000-1-2000-m in Step 194, whereby the comparison start is synchronized at all slave adapters 2000-1-2000-m.

Master adapter 1000-1 then transmits the access request that was directed to slave core 20-1 from master core 10-1 to slave core 20-1 by way of router node group 210 in Step 195.

Slave adapter 2000-1 then receives the access request from master core 10-1 in Step 196 and waits for the access request from master core 10-n that is the object of comparison.

On the other hand, master adapter 1000-n transmits the access request that was directed to slave core 20-1 from master core 10-n to slave core 20-1 by way of router node group 210 in Step 197.

Slave adapter 2000-1 then receives the access request from master core 10-n in Step 198, compares with the access request with master core 10-1, and verifies that the access requests match.

Slave adapter 2000-1 then accesses slave core 20-1 in Step 199.

Figure 31:
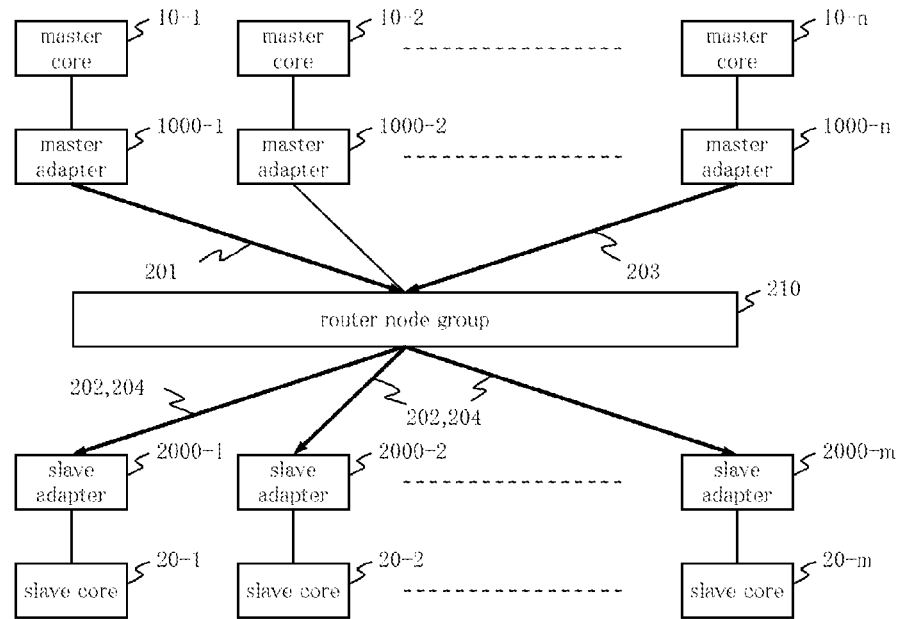
FIG. 31 is an explanatory view of an example of the operation when stopping comparison of the information processor in the configuration shown in FIG. 29.

FIG. 31 is an explanatory view of an example of the operation of stopping comparison of the information processor in the configuration shown in FIG. 29. In this example, the process of stopping comparison between master core 10-1 and master core 10-n is described.

Master adapter 1000-1 receives a comparison stop request from master core 10-1, and in Step 201, transmits the comparison stop request with master core 10-n to all slave adapters 2000-1-2000-m by way of router node group 210.

In Step 202, router node group 210 broadcasts to all slave adapters 2000-1-2000-m the request to stop comparison with master core 10-n that was received from master core 10-1. Here, all slave adapters 2000-1-2000-m await the request to stop comparison with master core 10-1 from master core 10-n.

On the other hand, master adapter 1000-n receives the comparison stop request from master core 10-n and transmits the request to stop comparison with master core 10-1 to all slave adapters 2000-1-2000-m by way of router node group 210 in Step 203.

Router node group 210 broadcasts the request to stop comparison with master core 10-1 that was received from master core 10-n to all slave adapters 2000-1-2000-m in Step 204, whereby the comparison stop is synchronized at all slave adapters 2000-1-2000-m. As a result, subsequent accesses do not become objects of comparison.

Figure 32:
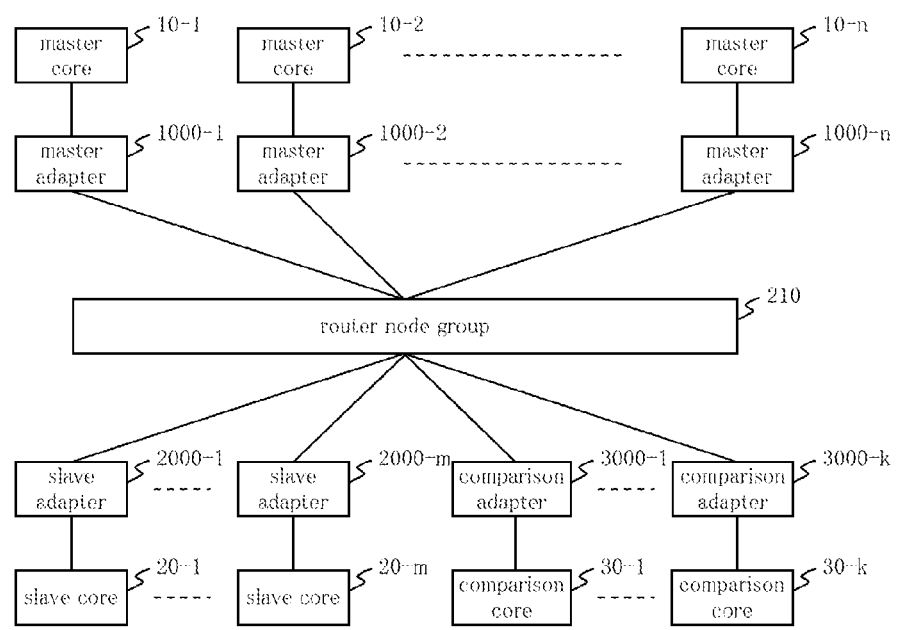
FIG. 32 shows the third embodiment of the information processor of the present invention.

FIG. 32 shows the third embodiment of the information processor of the present invention.

Referring to FIG. 32, the present embodiment is realized by additionally providing the second embodiment shown in FIG. 29 with comparison adapters 3000-1-3000-k and comparison cores 30-1-30-k.

Comparison adapters 3000-1-3000-k are normal adapters provided as interfaces with comparison cores 30-1-30-k.

Comparison cores 30-1-30-k have the characteristic of cutting out the comparison function belonging to slave adapters 2000-1-2000-m and implementing control of comparison starts and comparison stops in comparison cores 30-1-30-k rather than in slave adapters 2000-1-2000-m.

The connections of comparison cores 30-1-30-k and comparison adapters 3000-1-3000-k differ from the direct connections of conventional CPUs and are connected by way of an interconnected network, whereby wiring resources can be reduced.

Because the configuration shown in FIG. 32 is in the form of an addition to the configuration shown in FIG. 29, the same numbers as shown in FIG. 29 are given to slave adapters 2000-1-2000-m. Of course, if there is no need to carry out control of comparison starts and comparison stops in slave adapters 2000-1-2000-m, comparison synchronization reception means 2300 may be deleted from slave adapters 2000-1-2000-m.

Explanation next regards the connection configuration and operation of comparison adapters 3000-1-3000-k. The connection configuration and operation of comparison adapter 3000-1 are here described as an example. The connection configuration and operation of comparison adapters 3000-2-3000-k are equivalent to the connection configuration and operation of comparison adapter 3000-1.

Figure 33:
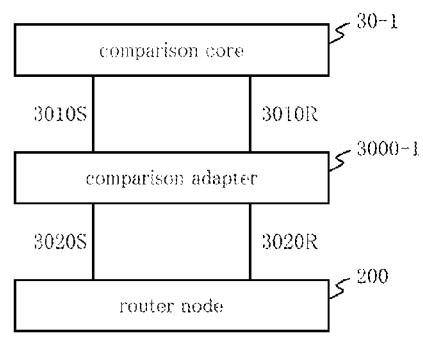
FIG. 33 shows an example of the mode of connection of a comparison adapter shown in FIG. 32.

FIG. 33 shows an example of the connection mode of comparison adapter 3000-1 shown in FIG. 32.

Referring to FIG. 33, comparison adapter 3000-1 is connected to comparison core 30-1 by way of comparison core transmission signal 3010S from comparison core 30-1 and comparison core reception signal 3010R to comparison core 30-1. In addition, comparison from adapter 3000-1 is connected to router node 200 by way of comparison adapter transmission signal 3020S transmitted to router node 200 and comparison adapter reception signal 3020R received from router node 200.

Figure 34:
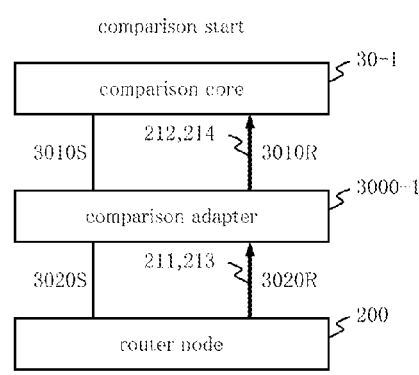
FIG. 34 is an explanatory view of an example of the operation when starting comparison in the comparison adapter in the configuration shown in FIG. 33.

FIG. 34 is an explanatory view of an example of the operation for starting comparison of comparison adapter 3000-1 in the mode shown in FIG. 33. In this example, the processing of the requests to start comparison from master core 10-1 and master core 10-n is described.

Comparison adapter 3000-1 receives a comparison start request at comparison core 30-n from master core 10-1 in Step 211.

Comparison adapter 3000-1 then passes the comparison start request that was received in Step 211 to comparison core 30-1 in Step 212. Comparison core 30-1 waits for a comparison start request from the other master core 10-n.

Comparison adapter 3000-1 receives a comparison start request at comparison core 30-1 from master core 10-n in Step 213.

Comparison adapter 3000-1 then passes the comparison start request that was received in Step 213 to comparison core 30-1 in Step 214. Comparison core 30-1, by means of the comparison start request, synchronizes comparison of master core 10-1 and master core 10-n.

Accesses of objects of comparison master cores 10-1 and 10-n after synchronization of comparison are all transmitted to comparison core 30-1, and matching is then determined in master core 30-1. If matching does not occur, an error response is returned to master cores 10-1 and 10-n.

Figure 35:
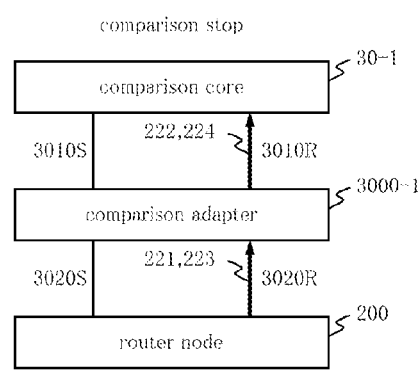
FIG. 35 is an explanatory view of an example of the operation when stopping comparison in the comparison adapter in the configuration shown in FIG. 33.

FIG. 35 is an explanatory view of an example of the operation of stopping comparison of comparison adapter 3000-1 in the mode shown in FIG. 33. In this example, the processing of requests to stop comparison from master core 10-1 and master core 10-n is described.

Comparison adapter 3000-1 receives a comparison stop request at comparison core 30-1 from master core 10-1 in Step 221.

Comparison adapter 3000-1 then passes the comparison stop request that was received in Step 221 to comparison core 30-1 in Step 222. Comparison core waits for a comparison stop request from another master core 10-n.

Comparison adapter 3000-1 receives a comparison stop request at comparison core 30-1 from master core 10-n in Step 223.

Comparison adapter 3000-1 then passes the comparison stop request that was received in Step 223 to comparison core 30-1 in Step 224. Comparison core 30-1, by means of the comparison stop request, synchronizes the comparison stop of master core 10-1 and master core 10-n.

Accesses of objects of comparison master cores 10-1 and 10-n that follow the synchronization of the stop of comparison are all transmitted to slave core 20-1 instead of comparison core 30-1.

Figure 36:
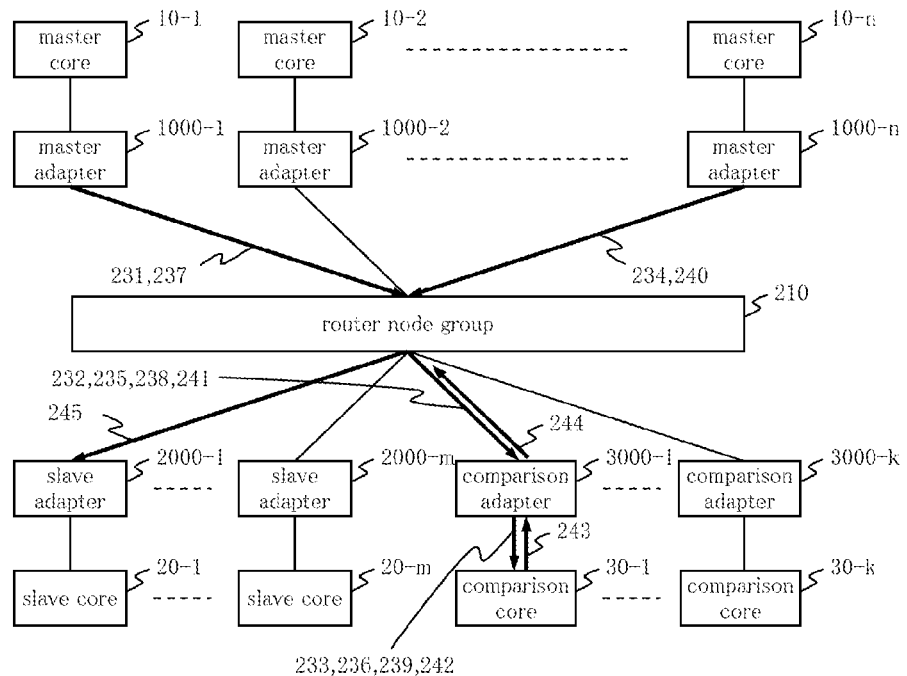
FIG. 36 is an explanatory view of an example of the operation when starting comparison in the information processor in the configuration shown in FIG. 32.

FIG. 36 is an explanatory view of an example of the operation of starting comparison of the information processor in the mode shown in FIG. 32. In this example, processing of the start of comparison of master core 10-1 and master core 10-n is described.

Master adapter 1000-1 receives a comparison start request from master core 10-1, and transmits the request to start comparison with master core 10-n to comparison adapter 3000-1 by way of router node group 210 in Step 231.

Router node group 210 transmits the request to start comparison with master core 10-n that was transmitted from master adapter 1000-1 to comparison adapter 3000-1 in Step 232.

Comparison adapter 3000-1 passes the comparison start request that was transmitted from router node group 210 in Step 232 to comparison core 30-1 in Step 233. As a result, comparison core 30-1 enters a state of waiting for synchronization with master core 10-n.

In addition, master adapter 1000-n receives a comparison start request from master core 10-n and transmits the request to start comparison with master core 10-1 to comparison adapter 3000-1 by way of router node group 210 in Step 234.

Router node group 210 transmits the request to start comparison with master core 10-1 that was transmitted from master adapter 1000-n to comparison adapter 3000-1 in Step 235.

Comparison adapter 3000-1 passes the comparison start request that was transmitted from router node group 210 in Step 235 to comparison core 30-1 in Step 236. As a result, the start of comparison of master core 10-1 and master core 10-n is synchronized at comparison core 30-1.

Master adapter 1000-1 then receives a request to access slave core 20-1 from master core 10-1 and transmits the request to access slave core 20-1 to comparison adapter 3000-1 by way of router node group 210 in Step 237.

Router node group 210 transmits the request to access slave core 20-1 that was transmitted from master adapter 1000-1 to comparison adapter 3000-1 in Step 238.

Comparison adapter 3000-1 passes the access request that was transmitted from router node group 210 in Step 238 to comparison core 30-1 in Step 239. Comparison core 30-1 waits for an access request from master core 10-n.

Master adapter 1000-n receives a request to access slave core 20-1 from master core 10-n and transmits the request for access to slave core 20-1 to comparison adapter 3000-1 by way of router node group 210 in Step 240.

Router node group 210 transmits the request to access slave core 20-1 that was transmitted from master adapter 1000-n to comparison adapter 3000-1 in Step 241.

Comparison adapter 3000-1 passes the access request that was transmitted from router node group 210 in Step 241 to comparison core 30-1 in Step 242. Comparison core 30-1 carries out comparison and verifies that the results match.

Comparison core 30-1 then reports the access request to comparison adapter 3000-1 in Step 243.

Comparison adapter 3000-1 transmits the access request that was reported from comparison core 30-1 to router node group 210 in Step 244.

Router node group 210 passes the access request that was transmitted from comparison adapter 3000-1 to slave adapter 2000-1 in Step 245, whereby slave core 20-1 is accessed by way of slave adapter 2000-1.

Here, the comparison of read data may be added in the case of a read request. Alternatively, accesses to slave core 20-1 may be merged into one access, the read data copied, and responses made to master cores 10-1 and 10-n. In this way, methods of the related art relating to increasing the efficiency of access and the reliability of data can be combined.

Alternatively, the synchronization or non-synchronization of a comparison starts may be reported to master adapters 1000-1 and 1000-n by means of packets that have been separately synchronized.

Figure 37:
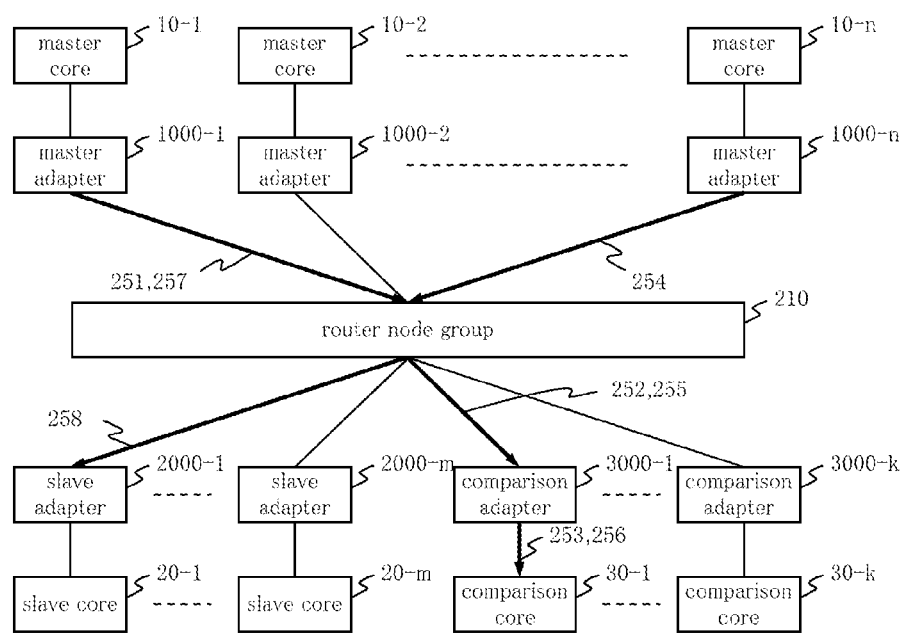
FIG. 37 is an explanatory view of an example of the operation when stopping comparison in the information processor in the configuration shown in FIG. 32.

FIG. 37 is an explanatory view of an example of the comparison stop operation of an information processor in the configuration shown in FIG. 32. In this example, the process of stopping comparison of master core 10-1 and master core 10-n is described.

Master adapter 1000-1 receives a comparison stop request from master core 10-1 and transmits the request to stop comparison with master core 10-n to comparison adapter 3000-1 by way of router node group 210 in Step 251.

Router node group 210 transmits to comparison adapter 3000-1 the request to stop comparison with master core 10-n that was transmitted from master adapter 1000-1 to comparison adapter 3000-1 in Step 252.

Comparison adapter 3000-1 passes the comparison stop request that was transmitted from router node group 210 in Step 252 to comparison core 30-1 in Step 253. As a result, comparison core 30-1 enters a state of waiting for synchronization of comparison stop with master core 10-n.

Master adapter 1000-n receives the comparison stop request from master core 10-n and transmits the request to stop comparison with master core 10-1 to comparison adapter 3000-1 by way of router node group 210 in Step 254.

Router node group 210 transmits to comparison adapter 3000-1 the request to stop comparison with master core 10-1 that was transmitted from master adapter 1000-*n* to comparison adapter 3000-1 in Step 255.

Comparison adapter 3000-1 passes the comparison stop request that was transmitted from router node group 210 in Step 255 to comparison core 30-1 in Step 256. As a result, synchronization of the stopping of comparison of master core 10-1 and master core 10-*n* is established in comparison core 30-1.

Master adapter 1000-1 receives a request to access slave core 20-1 from master core 10-1 and transmits the request to access slave core 20-1 to slave adapter 2000-1 by way of router node group 210 in Step 257.

Router node group 210 transmits the request to access slave core 20-1 that was transmitted from master adapter 1000-1 to slave adapter 2000-1 in Step 258.

It is here assumed that the realization of synchronization or lack of realization of comparison stop is separately reported to master adapter 2000-1 by means of a response packet for reporting the realization of synchronization. When notification is not possible, access to slave core 20-1 may be realized from slave adapter 2000-1 by way of comparison adapter 3000-1 and comparison core 30-1. In any case, any typical method can be applied that ensures that succeeding packets do not pass the synchronization point.

In this way, comparison can be easily realized in a core in which only the comparison function is extracted by means of a technology for controlling a plurality of slave adapters 2000-1-2000-*m*. Although explanation is related to one comparison core 30-1 in this embodiment, the same measures can be taken in the case of a plurality of comparison cores 30-1-30-*k* to avoid bottlenecks resulting from concentrated access.

The present embodiment enables distribution of network traffic through hierarchical control of comparison cores 30-1-30-*k* and comparison adapters 3000-1-3000-*k*, and further, enables a reduction of the latency resulting from transfer in comparison adapters 3000-1-3000-*k*.

Although examples were described in the above-described embodiments in which slave adapters 2000-1-2000-*m* compare two master cores among master cores 10-1-10-*n*, a plurality of any master cores, i.e., two or more of master cores 10-1-10-*n*, can be compared with each other. Such comparison can be realized by providing a plurality of comparison functions described above in slave adapters 2000-1-2000-*m*. For example, the comparison of master core 10-1 and master core 10-2 and the comparison of master core 10-3, master core 10-4, and master core 10-5 can be carried out simultaneously. The same holds true for comparison cores 30-1-30-*k* and comparison adapters 3000-1-3000-*k*.

In the above-described embodiments, an information processor and information processing method were described that relate to a device having a plurality of CPUs connected by an interconnected network, and in particular, that utilize an interconnected network and that enable high-speed and flexible switching between a high-reliability mode and a high-performance mode. The present invention is in no way limited to this device and method and can be applied to any device and method. For example, the information processor may be a semiconductor integrated circuit.

Although the present invention has been described regarding the above-described embodiment, the present invention is not limited to only the configuration and operation of the above-described embodiment and of course includes various modifications and alterations within the scope of the present invention that will be readily apparent to one skilled in the art.

The present application is the National Phase of PCT/JP2008/058062 filed on Apr. 25, 2008 which claims priority based on Japanese Patent Application No. 2007-215896 for which application was submitted on Aug. 22, 2007, and incorporates all of the disclosures of that application.

What is claimed is:

1. An information processor comprising:
   a plurality of master cores that are arithmetic devices capable of programmed operation;
   a plurality of slave cores that are peripheral devices of the master cores;
   a plurality of slave adapters connected to each of said plurality of slave cores; and
   an interconnected network for connecting said master cores and said slave adapters by way of a plurality of router nodes; wherein:
   said slave adapters compare a first access request transmitted by a first master core among said plurality of master cores and a second access request transmitted by a second master core other than said first master core among said plurality of master cores based on a request from said first master core and a request from said second master core; when said first access request and said second access request match, transmit said first access request or said second access request to the slave core that is connected to the slave adapter; and transmit an error response to said first master core and said second master core when said first access request and said second access request do not match.

2. The information processor as set forth in claim 1, wherein said slave adapters compare a plurality of access requests that have been transmitted from each of said plurality of master cores.

3. The information processor as set forth in claim 1, wherein said information processor is a semiconductor integrated circuit.

4. An information processor comprising:
   a plurality of master cores that are arithmetic devices capable of programmed operation,
   a plurality of slave cores that are peripheral devices of the master cores;
   a plurality of slave adapters connected to each of said plurality of slave cores; and
   an interconnected network for connecting said master cores and said slave adapters by way of a plurality of router nodes; wherein:
   said slave adapters compare a first access request transmitted by a first master core among said plurality of master cores and a second access request transmitted by a second master core other than said first master core among said plurality of master cores based on a request from said first master core and a request from said second master core; when said first access request and said second access request match, transmit said first access request or said second access request to the slave core that is connected to the slave adapter, wherein:
   said first master core transmits a first comparison start request to request the start of said comparison;
   said second master core transmits a second comparison start request to request the start of said comparison; and
   said slave adapters start said comparison upon receiving said first comparison start request and said second comparison start request.

5. An information processor comprising:
a plurality of master cores that are arithmetic devices capable of programmed operation,
a plurality of slave cores that are peripheral devices of the master cores;
a plurality of slave adapters connected to each of said plurality of slave cores; and
an interconnected network for connecting said master cores and said slave adapters by way of a plurality of router nodes; wherein:
said slave adapters compare a first access request transmitted by a first master core among said plurality of master cores and a second access request transmitted by a second master core other than said first master core among said plurality of master cores based on a request from said first master core and a request from said second master core; when said first access request and said second access request match, transmit said first access request or said second access request to the slave core that is connected to the slave adapter, wherein:
said first master core transmits a first comparison stop request to request stopping of said comparison;
said second master core transmits a second comparison stop request to request stopping of said comparison; and
said slave adapters stop said comparison upon receiving said first comparison stop request and said second comparison stop request.

6. An information processor comprising:
a plurality of master cores that are arithmetic devices capable of programmed operation,
a plurality of slave cores that are peripheral devices of the master cores;
a plurality of slave adapters connected to each of said plurality of slave cores; and
an interconnected network for connecting said master cores and said slave adapters by way of a plurality of router nodes; wherein:
said slave adapters compare a first access request transmitted by a first master core among said plurality of master cores and a second access request transmitted by a second master core other than said first master core among said plurality of master cores based on a request from said first master core and a request from said second master core; when said first access request and said second access request match, transmit said first access request or said second access request to the slave core that is connected to the slave adapter, said information processor further comprising:
a plurality of comparison adapters connected to said plurality of router nodes; and
a plurality of comparison cores connected to respective comparison adapters of said plurality of comparison adapters; wherein:
said comparison cores compare a first access request transmitted by a first master core among said plurality of master cores and a second access request transmitted by a second master core among said plurality of master cores other than said first master core based on a request from said first master core and a request from said second master core; and, when said first access request and said second access request match, transmit said first access request or said second access request to the comparison adapter connected to the comparison core; and
said comparison adapters transmit said first access request or said second access request that was transmitted from said comparison core to said slave adapter by way of said router nodes.

7. The information processor as set forth in claim 6, wherein said comparison cores transmit an error response to said first master core and said second master core when said first access request and said second access request do not match.

8. The information processor as set forth in claim 6, wherein:
said first master core transmits a first comparison start request to request the start of said comparison;
said second master core transmits a second comparison start request to request the start of said comparison; and
said comparison cores start said comparison upon receiving said first comparison start request and said second comparison start request.

9. The information processor as set forth in claim 6, wherein:
said first master core transmits a first comparison stop request to request the stopping of said comparison;
said second master core transmits a second comparison stop request to request the stopping of said comparison; and
said comparison cores stop said comparison upon receiving said first comparison stop request and said second comparison stop request.

10. The information processor as set forth in claim 6; wherein said comparison cores compare a plurality of access requests transmitted from each of said plurality of master cores.

11. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, and an interconnected network for connecting said master cores and said slave adapters by way of router nodes; said information processing method comprising processes of:
said slave adapters comparing a first access request transmitted by a first master core among said plurality of master cores and a second access request transmitted by a second master core among said plurality of master cores other than said first master core based on a request from said first master core and a request from said second master core;
when said first access request and said second access request match, said slave adapters transmitting said first access request or said second access request to the slave core that is connected to the slave adapter; and
when said first access request and said second access request do not match, said slave adapters transmitting an error response to said first master core and said second master core.

12. The information processing method as set forth in claim 11, further comprising a process of said slave adapters comparing a plurality of access requests that have been transmitted from each of said plurality of master cores.

13. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, and an interconnected network for connecting said master cores and said slave adapters by way of router nodes; said information processing method comprising processes of:
said slave adapters comparing a first access request transmitted by a first master core among said plurality of master cores and a second access request transmitted by a second master core among said plurality of master cores other than said first master core based on a request from said first master core and a request from said second master core;

when said first access request and said second access request match, said slave adapters transmitting said first access request or said second access request to the slave core that is connected to the slave adapter;

said first master core transmitting a first comparison start request to request start of said comparison;

said second master core transmitting a second comparison start request to request start of said comparison; and said slave adapters starting said comparison upon receiving said first comparison start request and said second comparison start request.

14. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, and an interconnected network for connecting said master cores and said slave adapters by way of router nodes; said information processing method comprising processes of:

said slave adapters comparing a first access request transmitted by a first master core among said plurality of master cores and a second access request transmitted by a second master core among said plurality of master cores other than said first master core based on a request from said first master core and a request from said second master core;

when said first access request and said second access request match, said slave adapters transmitting said first access request or said second access request to the slave core that is connected to the slave adapter;

said first master core transmitting a first comparison stop request to request stopping of said comparison;

said second master core transmitting a second comparison stop request to request stopping of said comparison; and said slave adapters stopping said comparison upon receiving said first comparison stop request and said second comparison stop request.

15. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, an interconnected network for connecting said master cores and said slave adapters by way of a plurality of router nodes; a plurality of comparison adapters connected to said plurality of router nodes, and a plurality of comparison cores each connected to a respective comparison adapter of said plurality of comparison adapters; said information processing method comprising processes of:

said comparison cores comparing a first access request transmitted by a first master core among said plurality of master cores and a second access request transmitted by a second master core among said plurality of master cores other than said first master core based on a request from said first master core and a request from said second master core;

when said first access request and said second access request match, said comparison cores transmitting said first access request or said second access request to the comparison adapter that is connected to the comparison core;

said comparison adapter transmitting said first access request or said second access request that was transmitted from said comparison core to said slave adapter by way of said router nodes; and when said first access request and said second access request do not match, said comparison core transmitting an error response to said first master core and said second master core.

16. The information processing method as set forth in claim 15; further comprising a process in which said comparison cores compare a plurality of access requests transmitted from each of said plurality of master cores.

17. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, an interconnected network for connecting said master cores and said slave adapters by way of a plurality of router nodes; a plurality of comparison adapters connected to said plurality of router nodes, and a plurality of comparison cores each connected to a respective comparison adapter of said plurality of comparison adapters; said information processing method comprising processes of:

said comparison cores comparing a first access request transmitted by a first master core among said plurality of master cores and a second access request transmitted by a second master core among said plurality of master cores other than said first master core based on a request from said first master core and a request from said second master core;

when said first access request and said second access request match, said comparison cores transmitting said first access request or said second access request to the comparison adapter that is connected to the comparison core;

said comparison adapter transmitting said first access request or said second access request that was transmitted from said comparison core to said slave adapter by way of said router nodes;

said first master core transmitting a first comparison start request to request start of said comparison;

said second master core transmitting a second comparison start request to request start of said comparison; and said comparison core starting said comparison upon receiving said first comparison start request and said second comparison start request.

18. An information processing method in an information processor having a plurality of master cores that are arithmetic devices capable of programmed operation, a plurality of slave cores that are peripheral devices of said master cores, a plurality of slave adapters each connected to a respective slave core of said plurality of slave cores, an interconnected network for connecting said master cores and said slave adapters by way of a plurality of router nodes; a plurality of comparison adapters connected to said plurality of router nodes, and a plurality of comparison cores each connected to a respective comparison adapter of said plurality of comparison adapters; said information processing method comprising processes of:

said comparison cores comparing a first access request transmitted by a first master core among said plurality of master cores and a second access request transmitted by a second master core among said plurality of master cores other than said first master core based on a request from said first master core and a request from said second master core;

when said first access request and said second access request match, said comparison cores transmitting said first access request or said second access request to the comparison adapter that is connected to the comparison core;

said comparison adapter transmitting said first access request or said second access request that was transmitted from said comparison core to said slave adapter by way of said router nodes;

said first master core transmitting a first comparison stop request to request stopping of said comparison;

said second master core transmitting a second comparison stop request to request stopping of said comparison; and said comparison cores stopping said comparison upon receiving said first comparison stop request and said second comparison stop request.

* * * * *